(12) United States Patent
Chartier et al.

(10) Patent No.: US 10,626,033 B2
(45) Date of Patent: Apr. 21, 2020

(54) BIOREACTOR FOR WASTEWATER TREATMENT

(71) Applicant: LES ENTREPRISES CHARTIER (2009) INC., Village St-Pierre (CA)

(72) Inventors: Leo-Michel Chartier, Saint-Paul (CA); Michel Chartier, Village St-Pierre (CA)

(73) Assignee: LES ENTREPRISES CHARTIER (2009) INC., Village Saint-Pierre (CA)

( * ) Notice: Subject to any disclaimer, the term of this patent is extended or adjusted under 35 U.S.C. 154(b) by 0 days.

(21) Appl. No.: 16/104,398

(22) Filed: Aug. 17, 2018

(65) Prior Publication Data
US 2018/0354827 A1 Dec. 13, 2018

Related U.S. Application Data

(63) Continuation-in-part of application No. PCT/CA2017/050198, filed on Feb. 16, 2017.
(Continued)

(51) Int. Cl.
*C02F 3/10* (2006.01)
*C02F 3/12* (2006.01)
(Continued)

(52) U.S. Cl.
CPC ............. *C02F 3/103* (2013.01); *C02F 3/102* (2013.01); *C02F 3/109* (2013.01); *C02F 3/121* (2013.01);
(Continued)

(58) Field of Classification Search
CPC .... C02F 3/102; C02F 2301/026; C02F 3/103; C02F 3/20; C02F 3/201
(Continued)

(56) References Cited

U.S. PATENT DOCUMENTS 3,923,656 A 12/1975 Krebs et al.
4,834,881 A 5/1989 Sawada et al.
(Continued)

FOREIGN PATENT DOCUMENTS

CN 201258281 6/2009
CN 102633412 8/2012
(Continued)

OTHER PUBLICATIONS

Korkut et al., "Wastewater Treatment With Biomass Attached to Porous Geotextile Baffles". Feb. 2006. Journal of Environmental Engineering. p. 284-88.
(Continued)

*Primary Examiner* — Claire A Norris
(74) *Attorney, Agent, or Firm* — Benoit & Cote, Inc.; C. Marc Benoit; Charles-André Caron

(57) ABSTRACT

There is described a bioreactor comprising a perforated tube for inputting wastewater therein, a textured wall, such as a geotextile membrane, and an oxygenating unit comprising a pressurized air bubble diffuser. The wall is spirally installed around the perforated tube, defining a passageway fluidly connected to the perforated tube and along which the wastewater inputted in the perforated tube is forced to travel. The membrane is adapted for hosting aerobic bacteria at a surface thereof. The oxygenating unit is provided at a bottom of the passageway for oxygenating the passageway. The bioreactor can be included in a treatment apparatus comprising primary treatment chambers and a decantation chambers, forming a standalone unit which is compact and easy to install.

19 Claims, 23 Drawing Sheets

Related U.S. Application Data

(60) Provisional application No. 62/296,304, filed on Feb. 17, 2016.

(51) Int. Cl.
*C02F 3/20* (2006.01)
*C02F 1/00* (2006.01)
*C02F 9/00* (2006.01)
*C02F 1/32* (2006.01)

(52) U.S. Cl.
CPC ............ *C02F 3/1242* (2013.01); *C02F 3/20* (2013.01); *C02F 9/00* (2013.01); *C02F 1/32* (2013.01); *C02F 3/105* (2013.01); *C02F 2001/007* (2013.01); *C02F 2203/002* (2013.01); *C02F 2301/026* (2013.01); *Y02W 10/15* (2015.05)

(58) Field of Classification Search
USPC ............ 210/615, 150, 620, 321.74, 321.83, 210/321.76, 321.85
See application file for complete search history.

(56) References Cited

U.S. PATENT DOCUMENTS

| | | | |
|---|---|---|---|
| 4,919,814 A | 4/1990 | Carnahan et al. | |
| 6,558,549 B2 | 5/2003 | Cote et al. | |
| 6,881,336 B2 * | 4/2005 | Johnson | B01D 63/10 210/321.74 |
| 7,140,495 B2 | 11/2006 | Hester et al. | |
| 8,142,106 B2 | 3/2012 | Couch et al. | |
| 8,528,745 B2 | 9/2013 | Husain et al. | |
| 8,623,213 B2 | 1/2014 | Liu et al. | |
| 2002/0020666 A1 * | 2/2002 | Cote | B01D 53/22 210/605 |
| 2012/0097590 A1 * | 4/2012 | Early | C02F 3/1242 210/198.1 |
| 2012/0273414 A1 | 11/2012 | Shechter et al. | |
| 2013/0266876 A1 | 10/2013 | Shechter et al. | |

FOREIGN PATENT DOCUMENTS

| | | |
|---|---|---|
| CN | 203187498 | 9/2013 |
| EP | 0587278 | 3/1994 |
| FR | 2166666 | 8/1973 |
| JP | S6227095 | 2/1987 |
| WO | 2011073977 | 6/2011 |
| WO | 2014130042 | 8/2014 |

OTHER PUBLICATIONS

Pham, Tham T, International Search Report of PCT/CA2017/050198. Form PCT/ISA/210, dated May 16, 2018. 3 pages.

* cited by examiner

FIGURE 9A
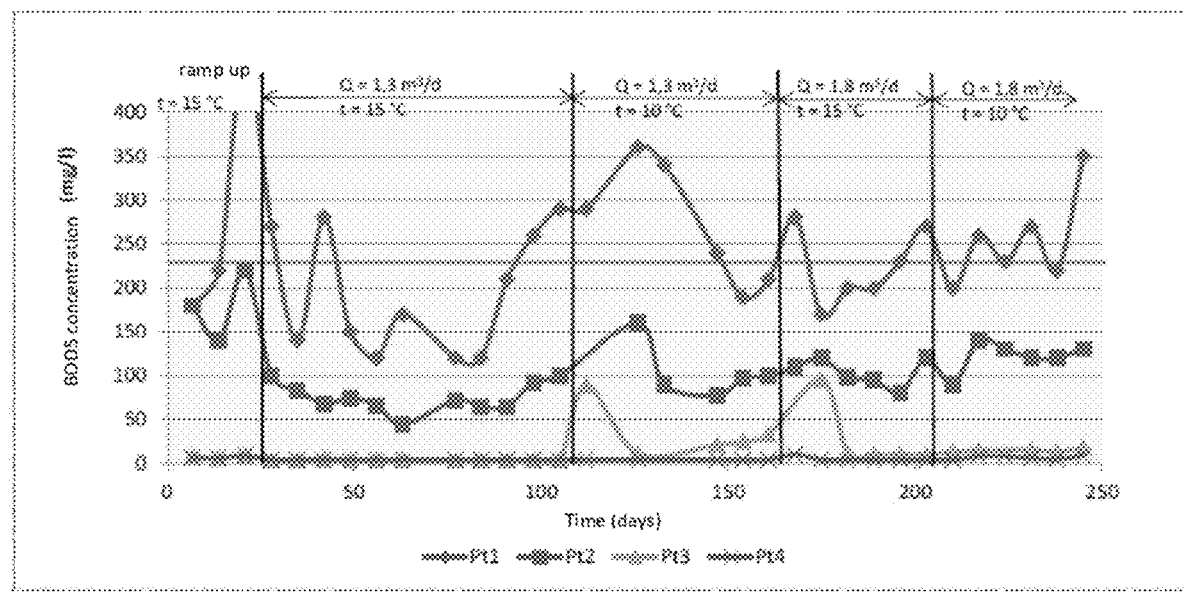
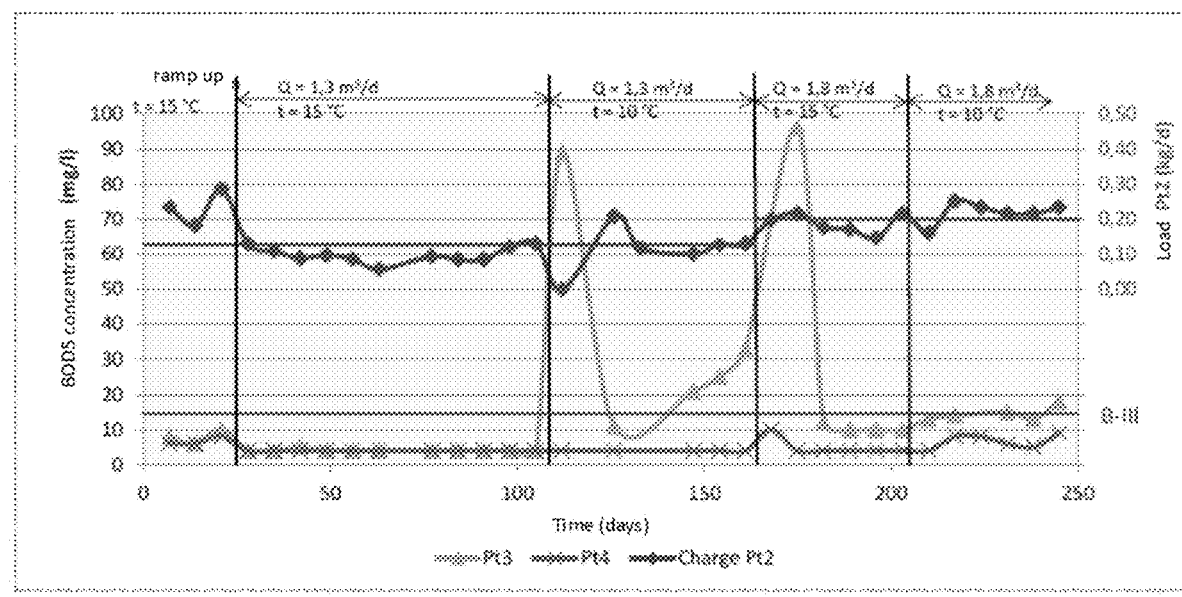
FIGURE 9B

BIOREACTOR FOR WASTEWATER TREATMENT

CROSS-REFERENCE TO RELATED APPLICATIONS

This application claims benefit from PCT/CA2017/050198, filed Feb. 16, 2017, which claims priority of U.S. provisional patent application 62/296,304, filed Feb. 17, 2016, the specification of which is hereby incorporated by reference.

BACKGROUND (a) Field

The subject matter disclosed generally relates to reactors for treating wastewater. More specifically, it relates to bioreactors.

(b) Related Prior Art

In low-density areas or isolated or remote locations where complex water treatment facilities are rare or absent, septic tanks are widely used. The effluent of a septic tank, or more generally of a primary water treatment, is often disposed onto land (a drain field) as part of the wastewater treatment.

There are various existing solutions trying to treat wastewater using more compact equipment. However, these solutions are usually complex and expensive. For example, they involve nanofiltration or reverse osmosis. Again, this is not adapted for rural or remote places where a primary water treatment is used.

There is thus a need for compact and low-complexity equipment adapted to treat wastewater such as primary water treatment effluents. This low-complexity equipment would be particularly adapted to remote areas, including residential areas but also for commercial or industrial facilities.

SUMMARY

According to an aspect of the invention, there is provided a bioreactor comprising: a perforated tube for inputting wastewater therein; a wall spirally installed around the perforated tube, defining a passageway fluidly connected to the perforated tube and along which an entirety of the wastewater inputted in the perforated tube is forced to travel, the wall being adapted for hosting aerobic bacteria at a surface thereof; and an oxygenating unit provided at a bottom of the passageway for oxygenating the passageway.

According to an embodiment, the perforated tube extends vertically and comprises at least one of: perforations; and a vertically-extending opening; allowing the wastewater inputted into the perforated tube to exit the perforated tube at a plurality of heights along the perforated tube.

According to an embodiment, the wall comprises a membrane held by support members into a spiral shape.

According to an embodiment, the wall being held by the support members undergoes a non-zero tension to avoid a deformation of the wall, when wastewater is being forced to travel in the passageway, that could cause a portion of the wall to touch another facing portion of the wall.

According to an embodiment, the membrane comprises a geotextile substantially made of polypropylene.

According to an embodiment, the geotextile comprises a non-woven needle-punched membrane.

According to an embodiment, the geotextile has a hydraulic permittivity between 0.96 $s^{-1}$ and 1.5 $s^{-1}$, and a filtration opening size between about 49 µm and 91 µm.

According to an embodiment, the geotextile has a thickness between 1 and 2 mm.

According to an embodiment, the membrane comprises a geocomposite membrane, which comprises a geomembrane and a geotextile, and comprises polypropylene and polyester.

According to an embodiment, the geocomposite membrane has a hydraulic transmissivity of between 5 and $7 \times 10^{-5}$ $m^2$/s under 8 kPa pressure, the geomembrane has a submillimeter thickness, and the geotextile has a thickness of about 4 to 5 mm.

According to an embodiment, the oxygenating unit comprises a perforated tube having perforations for outputting gas bubbles, the gas bubbles having a substantial oxygen content, wherein the perforations are located to allow the bubbles to travel from substantially the bottom of the passageway upwardly to aerate the wastewater substantially along its whole height.

According to an embodiment, the perforated tube is pressurized to provide the gas bubbles with a high pressure allowing oxygen to substantially dissolve in the wastewater when the wastewater is at an operational temperature.

According to an embodiment, the perforated tube for inputting wastewater is fluidly connected to an output of a primary water treatment.

According to an embodiment, the passageway comprises an end at which wastewater is outputted, the end of the passageway being fluidly connected to a decanter which is distinct from the bioreactor.

According to an embodiment, the passageway comprises an end at which wastewater is outputted, the end of the passageway being fluidly connected to a decanter which is an unventilated zone within the bioreactor.

According to another aspect of the invention, there is provided a method for treating wastewater comprising the steps of:

a) providing a bioreactor having a spirally extending wall forming a passageway originating at an inside location of the bioreactor and spirally extending outwardly from the inside location;

b) inputting wastewater downstream of a primary water treatment into the bioreactor;

c) forcing the wastewater to enter the passageway along a whole height of the passageway;

d) by keeping inputting wastewater into the bioreactor, and by providing the spirally extending wall with low hydraulic transmissivity from a bottom of the bioreactor to above a surface of the wastewater, forcing the wastewater to progress into the passageway only, wastewater crossing through the wall being marginal with respect to the wastewater forced to progress into the passageway; and e) providing oxygen bubbles at the bottom of the passageway substantially along a whole length of the passageway for growing aerobic bacteria on surfaces of the spirally extending wall exposed to the wastewater, the aerobic bacteria treating the wastewater.

According to an embodiment, there is further provided the step of:

e') providing oxygen bubbles substantially along a whole bottom of the bioreactor, thereby leaving substantially no zone of the bioreactor unventilated.

According to an embodiment, there is further provided the step of:

f) outputting the wastewater after treatment to a decanter distinct from the bioreactor.

According to an embodiment, there is further provided the step of:

f) providing an unventilated zone in a portion of the bioreactor at an end of the passageway and extending from the bottom of the bioreactor to the surface of the wastewater, for anaerobic treatment and decantation inside the bioreactor.

According to an embodiment, the step e) further comprises pressurizing the oxygen bubbles to provide dissolved oxygen in the wastewater in the passageway about a saturation level.

According to an aspect of the invention, there is provided a bioreactor comprising:
- a perforated tube for inputting wastewater therein;
- a wall spirally installed around the perforated tube, defining a passageway fluidly connected to the perforated tube and along which an entirety of the wastewater inputted in the perforated tube is forced to travel, the wall comprising a geotextile, in contact with the wastewater, adapted for hosting aerobic bacteria at a surface thereof; and
- an oxygenating unit provided at a bottom of the passageway for oxygenating the passageway.

According to an embodiment, the perforated tube extends vertically and comprises at least one of: perforations; and a vertically-extending opening; allowing the wastewater inputted into the perforated tube to exit the perforated tube at a plurality of heights along the perforated tube.

According to an embodiment, there are further provided support members secured, for support, to the perforated tube and holding the wall into a spiral shape.

According to an embodiment, the wall is held stretched by the support members to undergo a non-zero tension to avoid a deformation of the wall, when wastewater is being forced to travel in the passageway, that could cause a portion of the wall to touch another facing portion of the wall.

According to an embodiment, the geotextile is substantially made of polypropylene.

According to an embodiment, the geotextile comprises a non-woven needle-punched membrane.

According to an embodiment, the geotextile has a hydraulic permittivity between 0.96 s-1 and 1.5s-1, and a filtration opening size between about 49 μm and about 91 μm.

According to an embodiment, the geotextile has a thickness between 1 and 2 mm.

According to an embodiment, the wall comprises a geocomposite membrane, which comprises a geomembrane and the geotextile, and comprises polypropylene and polyester.

According to an embodiment, the geocomposite membrane has a hydraulic transmissivity of between 5 and 7×10−5 m2/s under 8 kPa pressure, the geomembrane has a submillimeter thickness, and the geotextile has a thickness of about 4 to 5 mm.

According to an embodiment, the oxygenating unit comprises a perforated tube having perforations for outputting gas bubbles, the gas bubbles having a substantial oxygen content, wherein the perforations are located to allow the bubbles to travel from substantially the bottom of the passageway upwardly to aerate the wastewater substantially along its whole height.

According to an embodiment, the perforated tube is pressurized to provide pressurized gas bubbles with a pressure allowing oxygen to substantially dissolve in the wastewater when the wastewater is at an operational temperature.

According to an embodiment, the perforated tube for inputting wastewater is fluidly connected to an output of a primary treatment system.

According to an embodiment, the passageway comprises an end at which wastewater is outputted, the end of the passageway being fluidly connected to a decanter which is distinct from the bioreactor.

According to an embodiment, the passageway comprises an end at which wastewater is outputted, the end of the passageway being fluidly connected to a decanter which is an unventilated zone within the bioreactor.

According to another aspect of the invention, there is provided a method for treating wastewater comprising the steps of:
a) providing a bioreactor having a spirally extending wall comprising a geotextile and forming a passageway originating at an inside location of the bioreactor and spirally extending outwardly from the inside location;
b) inputting wastewater downstream of a primary treatment system into the bioreactor;
c) forcing the wastewater to enter the passageway along a whole height of the passageway and contacting the wastewater with the geotextile;
d) by keeping inputting wastewater into the bioreactor, and by providing the spirally extending wall from a bottom of the bioreactor to above a surface of the wastewater, forcing the wastewater to progress into the passageway only, wastewater crossing through the wall being marginal with respect to the wastewater forced to progress into the passageway; and
e) providing oxygen bubbles at the bottom of the passageway substantially along a whole length of the passageway for growing aerobic bacteria on surfaces of the spirally extending wall exposed to the wastewater, the aerobic bacteria treating the wastewater.

According to an embodiment, there is further provided the step of:
e') providing oxygen bubbles substantially along a whole bottom of the bioreactor, thereby leaving substantially no zone of the bioreactor unventilated.

According to an embodiment, there is further provided the step of:
f) outputting the wastewater after treatment to a decanter distinct from the bioreactor.

According to an embodiment, there is further provided the step of:
f') providing an unventilated zone in a portion of the bioreactor at an end of the passageway and extending from the bottom of the bioreactor to the surface of the wastewater, for anaerobic treatment and decantation inside the bioreactor.

According to an embodiment, the step e) further comprises pressurizing the oxygen bubbles to provide dissolved oxygen in the wastewater in the passageway about a saturation level.

According to another aspect of the invention, there is provided a treatment apparatus having a substantially cylindrical enclosure with an apparatus wastewater input and an apparatus wastewater output, and comprising:
a bioreactor, at a center of the substantially cylindrical enclosure, comprising:
- a pipe acting as a collector for inputting wastewater therein;
- a wall spirally installed around the perforated tube, defining a passageway fluidly connected to the pipe acting as the collector and along which an entirety of the wastewater inputted in the pipe is forced to travel, the wall comprising a geotextile, in contact with the wastewater, adapted for hosting aerobic bacteria at a surface thereof; and an oxygenating unit provided at a bottom of the passageway for oxygenating the passageway.
a fermentation chamber, in communication with the apparatus wastewater input, for receiving the wastewater in the treatment apparatus;
an effluent chamber, in communication with the fermentation chamber for receiving the wastewater therefrom, and with the pipe acting as the collector for inputting wastewater into the bioreactor; and
a decantation chamber, in communication with an output of the bioreactor, for receiving the wastewater therefrom, and with the apparatus wastewater output for outputting wastewater from the treatment apparatus;
wherein the fermentation chamber, the effluent chamber and the decantation chamber are provided around the bioreactor, thus forming a self-contained unit inside the cylindrical enclosure.

According to an embodiment, there are further provided support members secured, for support, to the perforated tube of the bioreactor and to the cylindrical enclosure of the treatment apparatus and holding the wall of the bioreactor into a spiral shape.

According to an embodiment, the geotextile is substantially made of polypropylene.

According to an embodiment, the geotextile comprises a non-woven needle-punched membrane.

According to an embodiment, the geotextile has a hydraulic permeability between 0.15 cm/s and 0.25 cm/s, and a filtration opening size between about 49 μm and about 91 μm.

According to an embodiment, the geotextile has a thickness between 1 and 2 mm.

According to an embodiment, the oxygenating unit comprises a pressurized air bubble diffuser, further comprising a compressor for providing pressure to the oxygenating unit.

According to another aspect of the invention, there is provided a method for treating wastewater comprising the steps of:
 a) providing a bioreactor having a spirally extending wall comprising a geotextile and forming a passageway originating at an inside location of the bioreactor and spirally extending outwardly from the inside location;
 b) providing a fermentation chamber, an effluent chamber and a decantation chamber are provided around the bioreactor in a standalone unit;
 c) directing wastewater sequentially into the fermentation chamber and the effluent chamber for a primary treatment into the bioreactor;
 d) inputting the wastewater from the primary treatment into the bioreactor;
 e) forcing the wastewater to enter the passageway along a whole height of the passageway and contacting the wastewater with the geotextile;
 f) by keeping inputting wastewater into the bioreactor, and by providing the spirally extending wall from a bottom of the bioreactor to above a surface of the wastewater, forcing the wastewater to progress into the passageway; and
 g) providing oxygen bubbles at the bottom of the passageway substantially along a whole length of the passageway for growing aerobic bacteria on surfaces of the spirally extending wall exposed to the wastewater, the aerobic bacteria treating the wastewater.

According to an embodiment, there is further provided the step of:
 h) outputting the wastewater from the bioreactor after treatment to a decanting chamber distinct from the bioreactor and also provided around the bioreactor in the standalone unit.

According to an embodiment, providing oxygen bubbles comprises pressurizing the oxygen bubble at a pressure comprised between 0.34 bar and 0.68 bar at the bottom of the passageway using a compressor.

According to an embodiment, the compressor is located outside the standalone unit.

According to an embodiment, there is further provided the step of:
 g') providing oxygen bubbles substantially along a whole bottom of the bioreactor, thereby leaving substantially no zone of the bioreactor unventilated.

As will be realized, the subject matter disclosed is capable of modifications in various respects. Accordingly, the drawings and the description are to be regarded as illustrative in nature, and not as restrictive.

BRIEF DESCRIPTION OF THE DRAWINGS

Further features and advantages of the present disclosure will become apparent from the following detailed description, taken in combination with the appended drawings, in which:

FIGS. 9A to 19 are graphs illustrating various parameters monitored during the test made with the system of FIG. 7.

It will be noted that throughout the appended drawings, like features are identified by like reference numerals.

DETAILED DESCRIPTION

In embodiments there is disclosed a bioreactor for treating wastewater. A bioreactor is normally provided at the output of a primary water treatment and is not to be confused with the primary water treatment. It should also not be confused with bacterial filters.

Figure 1:
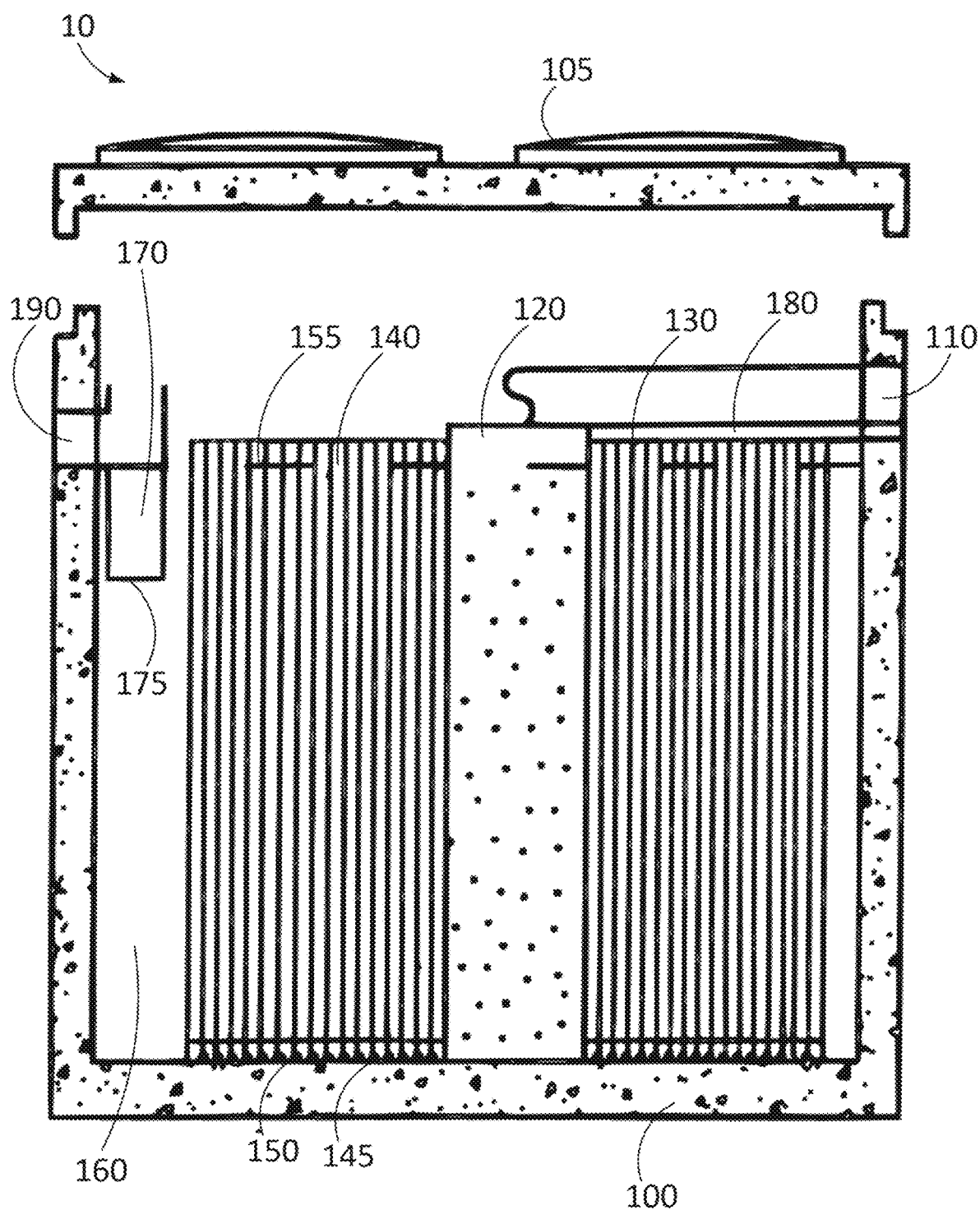
FIG. 1 is a side cross-section view illustrating a bioreactor for treating wastewater, according to an embodiment.
Figure 2A:
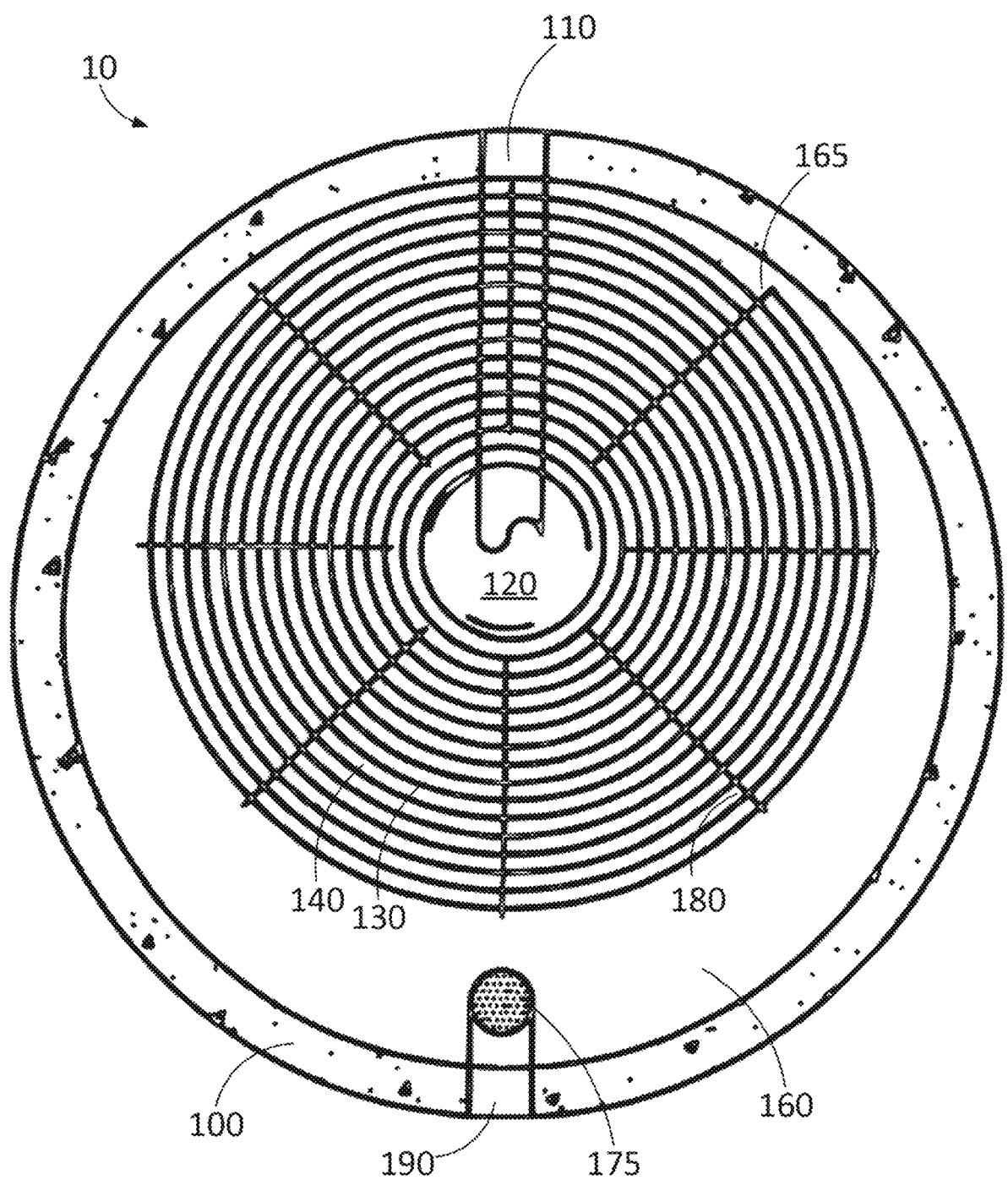
FIG. 2A is a top view illustrating the bioreactor of FIG. 1.

Referring now to the drawings, and more particularly to FIGS. 1-2A, a cross-section illustrates the bioreactor 10.

Figure 2B:
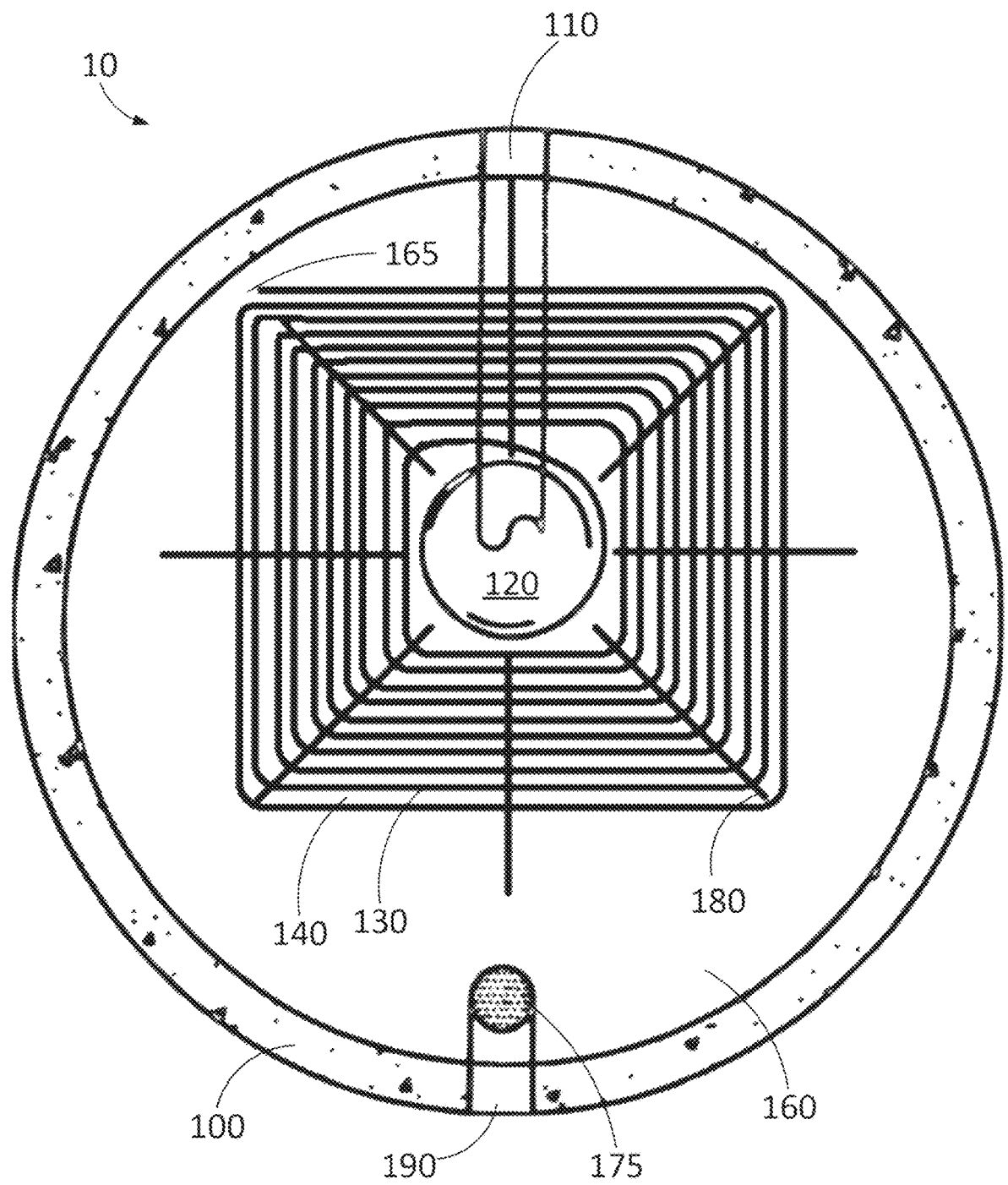
FIG. 2B is a top view illustrating a bioreactor with a wall having a rectangular spiral shape, according to an embodiment.
Figure 2C:
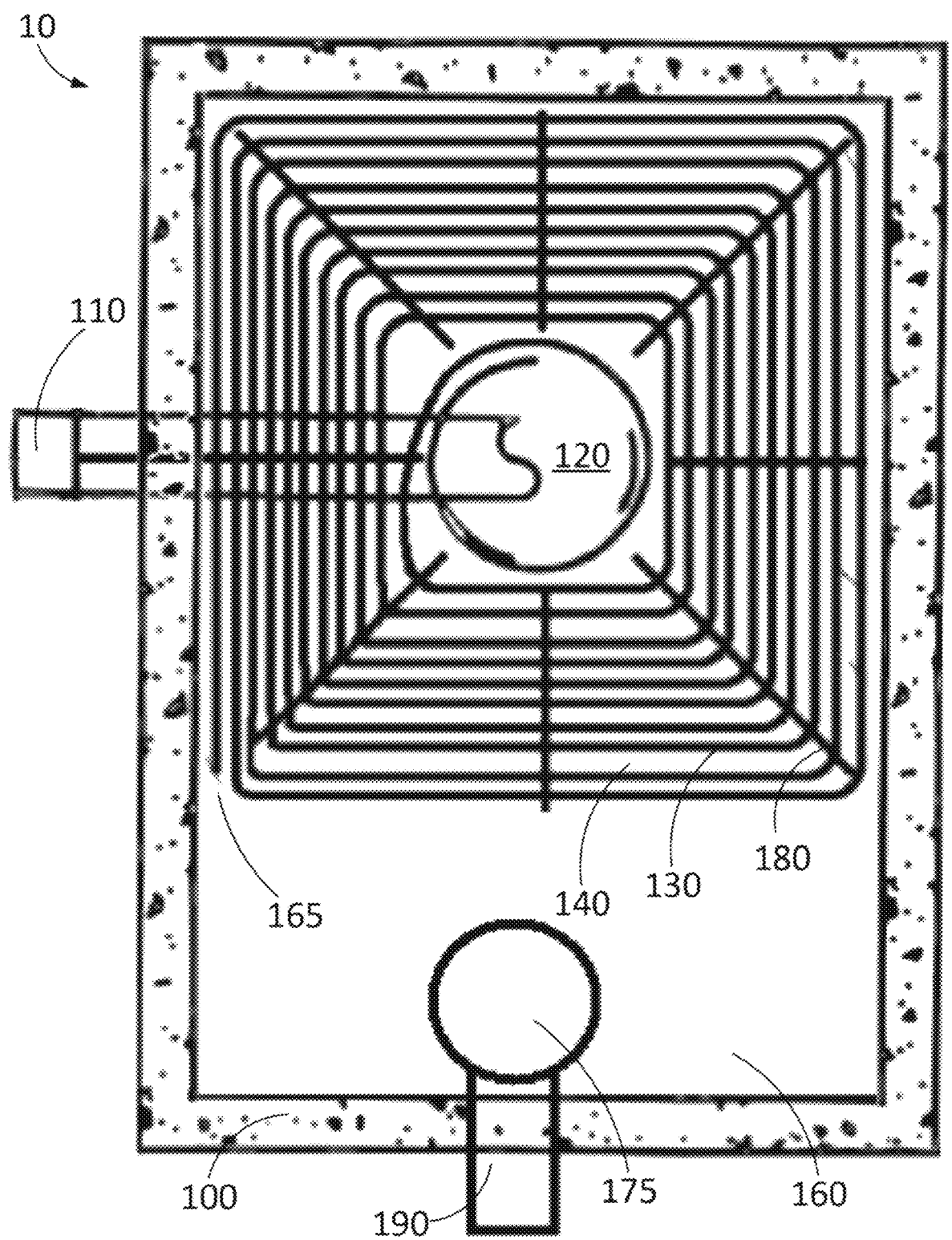
FIG. 2C is a top view illustrating a bioreactor with a wall having a rectangular spiral shape installed in a body having a rectangular shape, according to an embodiment.

The bioreactor 10 comprises a body 100, or bioreactor enclosure, for holding parts and water therein. The body 100 forms a container in which the wastewater is treated. According to an embodiment, the container can be opened: it comprises a cover 105 that is removable, as shown in FIG. 1. The body 100 can be provided in various shapes, such as cylindrical (as shown in FIG. 2A-2B), rectangular (as shown in FIG. 2C), or other polygonal, elliptic or irregular closed shapes suitable for holding liquids and equipment therein. The body 100 preferably forms a cylindrical enclosure for the bioreactor 10, as this is more compact and is more easily compatible for inclusion in a treatment apparatus, described further below, which can enclose the bioreactor 10 and be provided also in a cylindrical shape.

Figure 3:
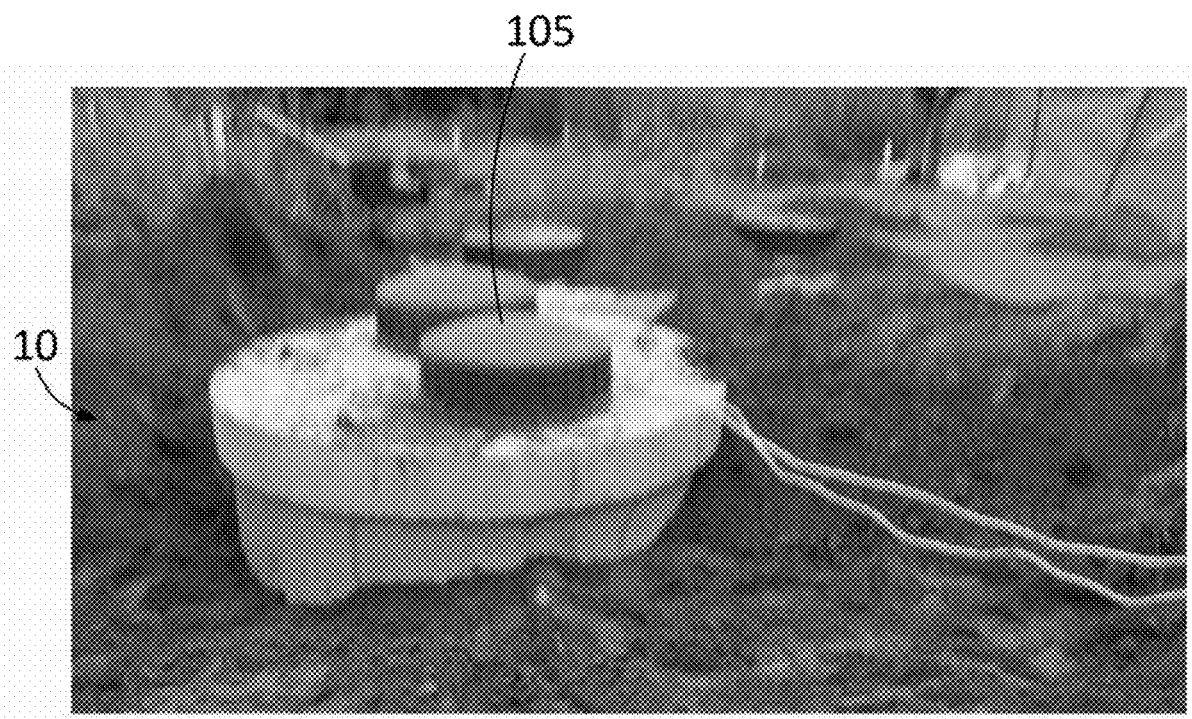
FIG. 3 is a picture showing a bioreactor buried into the ground with the cover still apparent, according to an embodiment.
Figure 4:
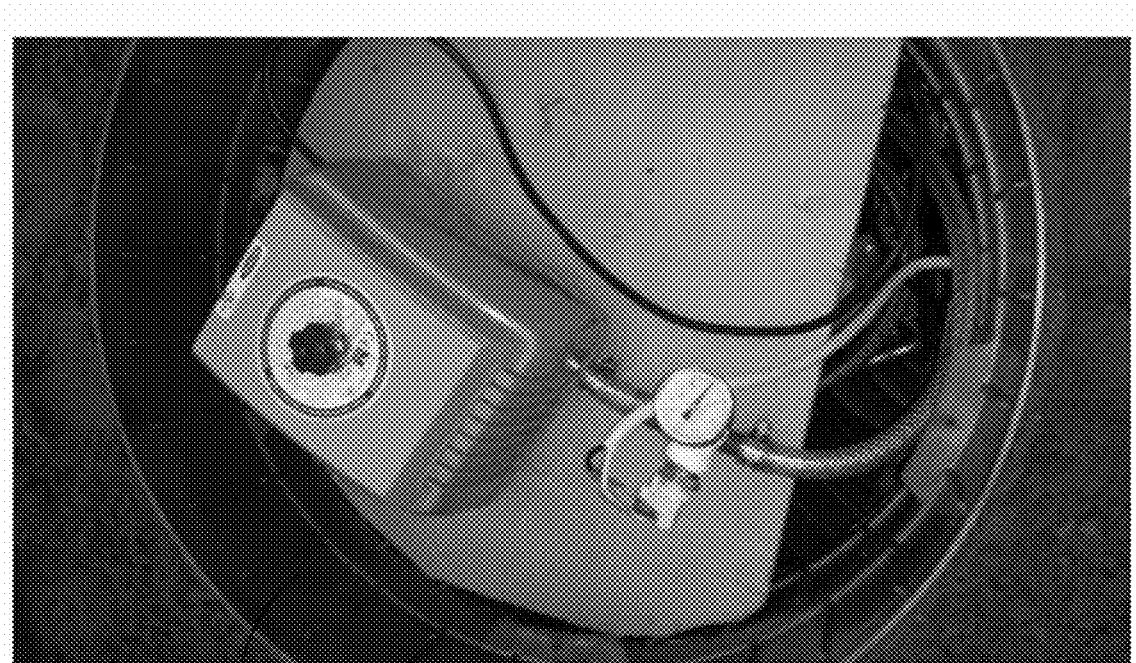
FIG. 4 is a picture showing inside a bioreactor when its cover is removed, according to an embodiment.
Figure 5:
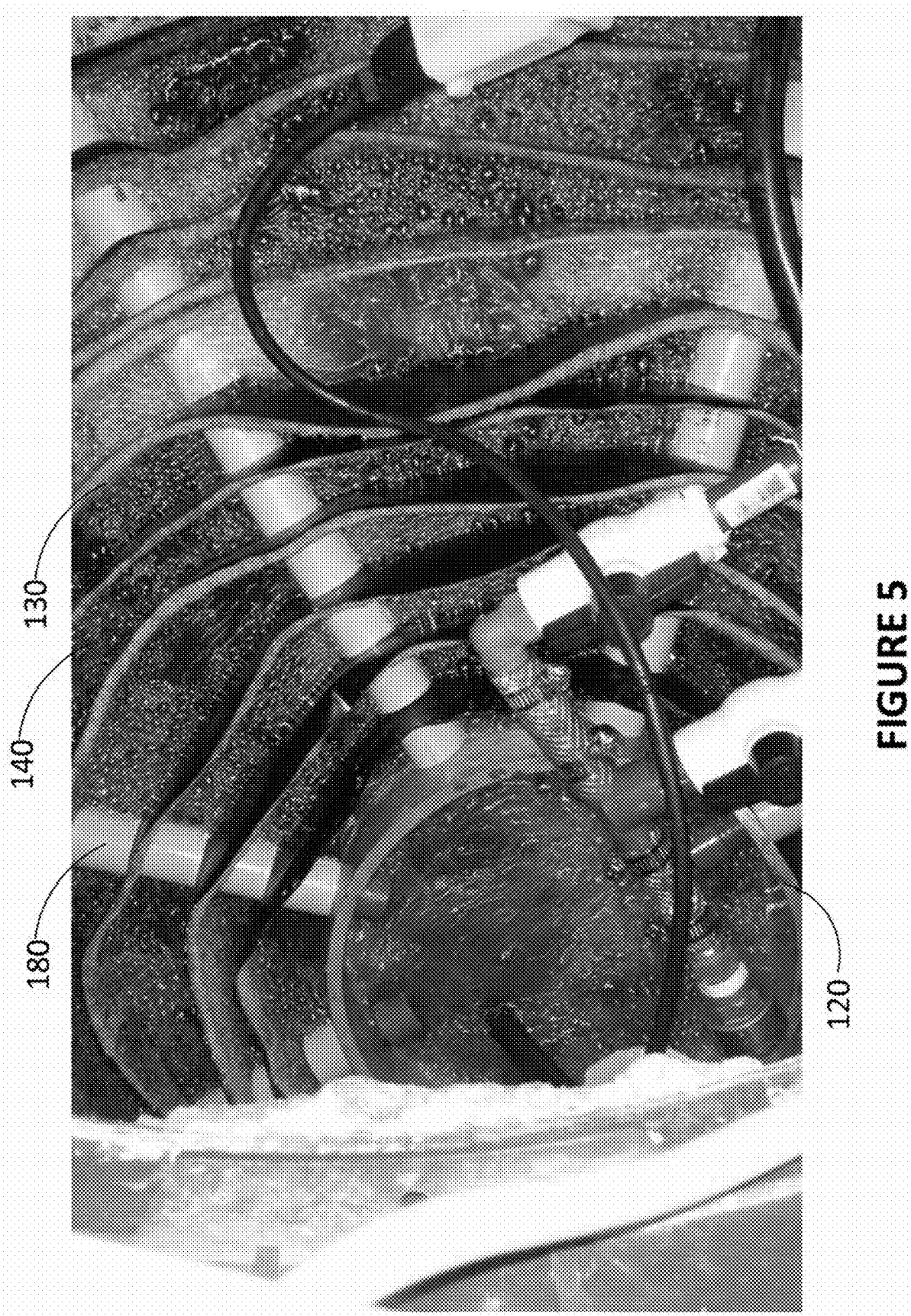
FIG. 5 is a picture showing wastewater being treated in an oxygenated passageway defined by a spirally positioned wall in a bioreactor, according to an embodiment.
Figure 6:
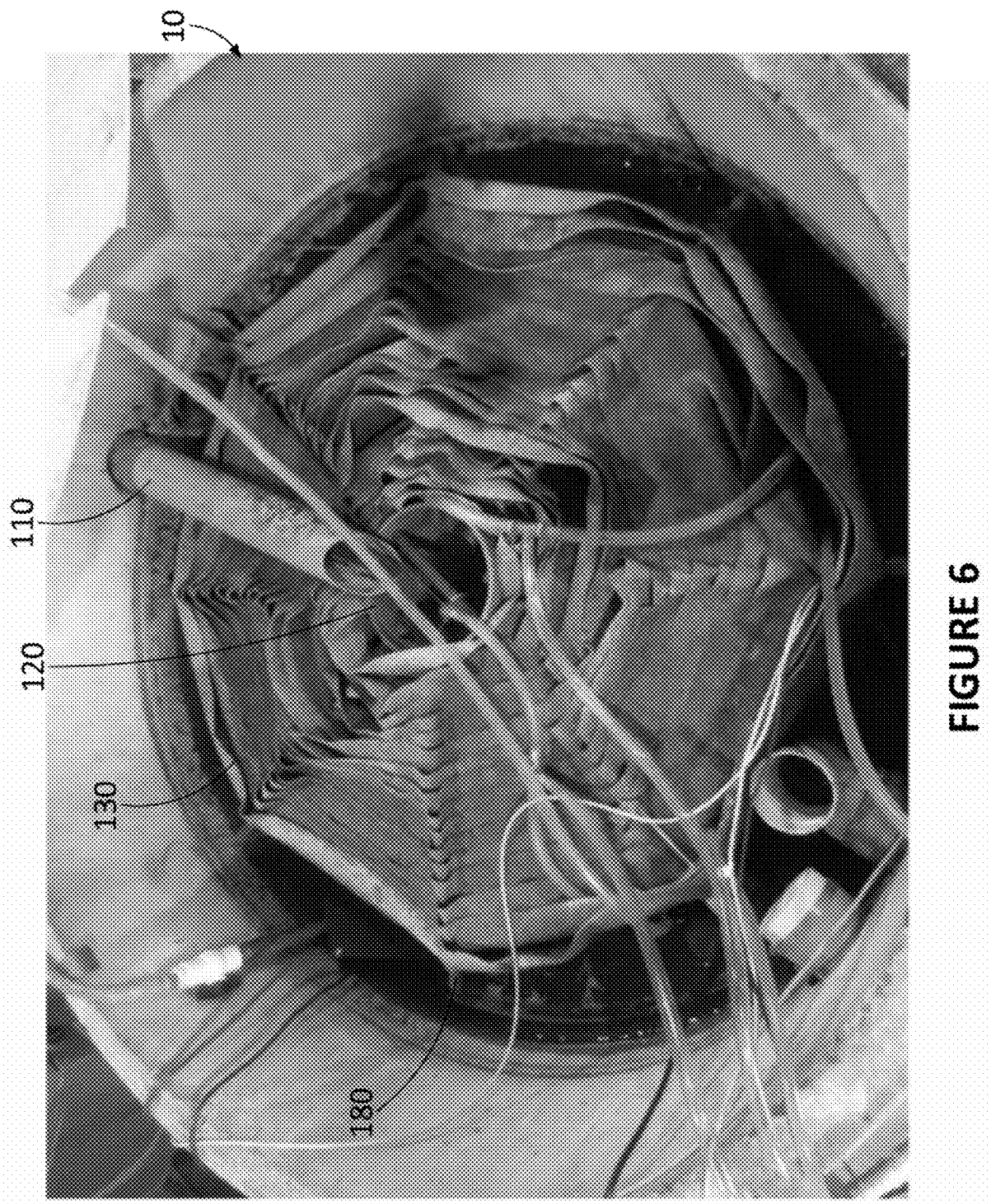
FIG. 6 is a picture showing wastewater being treated in an oxygenated passageway defined by a spirally positioned wall in a bioreactor, according to another embodiment.

The cover 105 is useful if the bioreactor 10 is to be buried into the ground, as shown in FIG. 3, in which case the cover 105 is removable in order to give access to inside the bioreactor 10. FIGS. 5-6 show inside the bioreactor 10 when the cover 105 is removed.

Now referring back to FIGS. 1-2A, wastewater is inputted into the bioreactor 10 via a water input 110. According to an embodiment, the water input 110 is a pipe that is operatively connected to the output of a primary water treatment (such as a septic tank, not shown) for bringing the effluent of the primary water treatment, (or more generally a primary treatment system) which is only partially treated, into the bioreactor 10. The primary water treatment has already removed a substantial fraction of matter which was previously in suspension in the wastewater.

The bioreactor 10 comprises an aerobic zone. According to an embodiment, the bioreactor 10 further comprises an unventilated zone 160 reached by the wastewater after having gone through the aerobic zone.

In order to enter the aerobic zone in the right way, the water input 110 brings the wastewater to the center of the container, as illustrated in FIGS. 1-2A. Along the central axis of the container, there is provided a perforated pipe 120 acting as a collector for the bioreactor 10. It should be noted that the central axis can be very roughly centrally located; in fact, the offset can be substantial, as shown in FIG. 2A, as long as a large enough aerobic zone can be defined therearound.

The wastewater is usually introduced at the top of the perforated pipe 120, although other configurations can be considered for this element acting as a collector and a distributor for wastewater that is inputted into the bioreactor 10.

The perforated pipe 120 is a pipe or duct or any other type of hollow and elongated container, substantially vertically positioned. FIG. 1 shows the perforated pipe 120 with a plurality of small apertures for letting wastewater flow therethrough, outside of the perforated pipe 120. The perforations can also be embodied as a single opening, a plurality of large apertures, slits, or any other perforation of any shape that can let water flow therethrough. Preferably, perforations are provided on the surface of the perforated pipe 120 along the height of the perforated pipe 120. According to an embodiment, the perforated pipe 120 is made of PVC. The perforated pipe 120 serves as a collector to receive incoming water to be treated, and the perforations are used to distribute the received incoming wastewater along the height of the water column in the bioreactor 10.

Around the perforated pipe 120, there is provided a wall 130 having a spiral shape. According to an embodiment, the wall 130 is impermeable to water. According to another embodiment, the wall 130 is permeable to water.

According to an embodiment, the wall 130 is a geotextile membrane (e.g., Soleno TX-170). This membrane has a thickness between 1 and 2 mm, e.g., 1.3 mm, and has minimum permittivity of about 0.96 $s^{-1}$, and preferably no greater than 1.5 $s^{-1}$ (therefore the permittivity is between these values). The permeability is about 0.2 cm/s (or more generally comprised between 0.15 and 0.25 cm/s), and the filtration opening size is comprised between 49 μm and 91 μm (nominal 70 μm). It is made of non-woven needle-punched polypropylene (as far as 100% polypropylene or substantially made of polypropylene). Such a geotextile membrane is a nonwoven needled geotextile.

According to another embodiment, the wall 130 is a geocomposite membrane (e.g., Soleno TX-MP), which comprises a geomembrane with a submillimeter thickness (about 0.5 mm) and a geotextile having a thickness of a few millimeters (e.g., between 4 and 5 mm). This composite membrane is made of polypropylene and polyester, i.e., a PVC geomembrane laminated with a geotextile, and is characterized by a low hydraulic transmissivity, e.g., between 5 and 7 or about $6 \times 10^{-5}$ $m^2$/s under 8 kPa pressure. These examples shall be viewed as non-limiting, as other equivalent brands, models or materials, with different thicknesses and hydraulic properties, can be used for the wall 130, as long as they provide the desired permeability or impermeability properties, or other hydraulic properties, depending on the circumstances in which wall 130 is being used.

The use of a geotextile membrane (such as the Soleno TX-170 mentioned above with the parameters as described) is advantageous in that it provides a texture onto which biomass can adhere and grow. A smooth surface, such as metal or plastic, is not suitable for biomass attachment to the surface and growth. When a smooth surface is used, most degradation is made by biomass in suspension. Providing a textured wall using, for example, a geotextile membrane offers the necessary textured support for bacteria attachment and biomass growth along the wall 130.

In addition to the substantial texture of the wall 130, i.e., irregularities on the surface that allow bacteria to attach for biomass growth, the non-zero permeability (e.g., about 0.2 cm/s for the exemplary geotextile membrane mentioned above) is sufficient to cause a hybrid type of hydraulic behavior in the bioreactor. The wall 130 provides a preferential hydraulic movement in the channels between the wall 130, while a small percentage of water is allowed to go through the geotextile membrane and thus be filtrated by the filtration openings which have an exemplary size comprised between 49 μm and 91 μm. This filtration through the slightly permeable geotextile membrane is a minor contributor to the overall treatment process, but is not negligible. Therefore, the geotextile membrane provides texture which aids in biomass attachment on surface growth, and also provides additional treatment by contributing to a minor filtration process, while simultaneously directing most of the water flow in channels defined by the geotextile membrane to be in contact with the biomass on the surface thereof.

The wall 130 is provided in a spiral shape around the perforated pipe 120. The embodiment in FIG. 2A shows a circular spiral. In other embodiments, the wall 130 can have a different shape, such as a substantially square spiral or a substantially rectangular spiral, as shown in FIG. 2B. The wall 130 can adopt an irregular spiral shape. Other shapes are possible: oval, polygon, combination of shapes, etc., as long as the wall is at least roughly shaped as a spiral in order to form a passageway 140. The wall 130 may also adopt a substantially linear shape along a portion thereof, defining a passageway 140 with a substantially linear portion, either at the beginning or the end of the spirally shaped passageway 140, or somewhere between the beginning and the end thereof.

Contrarily to some types of existing systems, the wall 130 is not used specifically for filtration (such as nanofiltration), even though minor filtration can occur as mentioned above. According to an embodiment, the wall 130 can be impermeable to water. For this reason, the wall 130 does not need to be rolled in a compact spiral. It rather forms a spiral, which can be loosely defined, thereby defining a passageway 140 of possibly variable local radius of curvature, or of possibly irregular width between two adjacent wall portions. The spiral passageway 140 is illustrated in FIG. 2. The width of the passageway 140 can vary between different equipment or within the same system, but is usually in the order of a few centimeters. This configuration is shown in FIG. 5, in which the possibly irregular spacing between adjacent wall parts is illustrated. Alternatively, and preferably as already mentioned above, the wall 130 can be permeable to water if desired (a geotextile membrane forming the wall 130 will have slight or marginal permeability), but substantial permeability should not be a requirement of the system, thus keeping the filtration path only as a small contributor to treatment and ensuring that most of the treatment is assumed by the biomass on the surface of the wall 130 and along which water flows (in the channels). More specific requirements about the expected ranges of hydraulic parameters are detailed further below.

It should further be noted that the photograph of the prototype of FIG. 5 shows a location where adjacent wall portions touch, thereby closing the passageway 140. This prototypal embodiment thus has walls 130 that are too loose since wall portions should not be allowed to move to create this deleterious situation. In the embodiment photographed in FIG. 6, the wall 130, made of the same membrane as in FIG. 5, undergoes a tensile force that keeps the walls 130 in their desired shape and substantially reduces looseness of the walls 130, thereby reducing by far the possibility of a spontaneous closing of the passageway 140. This tension can be applied when the membrane forming the wall 130 is installed and fixed to the support members 180.

Due to the spiral shape of the wall 130 and of the passageway 140 it defines, the length of the passageway 140 is long (a few to several meters) compared to the relatively small size of the bioreactor 10. Therefore, the spiral shape (or other equivalent spiral-like shapes) provides compactness.

According to an embodiment, the wall 130 is held in a substantially spiral shape with a support member 180, or a plurality of support members 180. For example, plastic (e.g., PVC) or metallic parts can be provided for holding the wall 130 in the desired position. FIG. 5 shows PVC tubes forming a plurality of support members 180 for holding the wall 130 in the spiral shape. If the wall 130 is held firmly and tight to the support members 180 when installed, a proper tension, or lack of looseness, can be provided to the wall 130 such that they remain in their intended position, i.e., each portion of the wall 130 extends along a vertical plane and parallel to its facing wall portion with which it defines the passageway 140. The support members 180 can be installed in radial directions in such a way that when the wall 130 is installed, it defines a spider-web shape when viewed from the top, as seen in FIG. 6.

The support members 180 are made necessary because the preferred use of a geotextile membrane requires a support as the geotextile membrane is flexible and cannot support its own weight without being deformed or collapsing.

The passageway 140 defines an aerobic zone through which the wastewater travels, until it reaches the passageway end 165, for being treated. The aerobic zone is defined from the bottom 145 of the passageway 140 to the waterline 155, shown in FIG. 1. This zone is where the aerobic degradation of organic matter takes place. Since the wall 130 is impermeable to water and extends from the bottom 145 of the container to above the waterline 155, the wastewater is forced to travel along the entire passageway 140. In another embodiment in which the wall 130 is not impermeable to water, it should still be thick enough or have minimal impermeability to provide some forcing of the water into the passageway 140.

Microbial degradation of organic matter in an oxygen-rich environment is enabled by the presence of microbial life on the wall 130, which acts as a stable substrate for microbial life to grow. The microbial life usually comprises aerobic bacteria, which find necessary nutrients in the wastewater in which they bathe, in the passageway 140.

The oxygen is injected by an oxygenating unit 150 provided at a lower portion of the passageway 140. In the embodiment shown in FIG. 1, the oxygenating unit 150 is provided at the bottom 145. The oxygenating unit 150 is for injecting air, oxygen, or a combination thereof (or any other suitable gas mixture having a sufficient and adequate level of oxygen) in the water lying in the passageway 140.

According to an embodiment, the oxygenating unit 150 comprises a horizontal perforated tube in which the preferably pressurized gas mixture flows, wherein bubbles are formed at the small perforations of the tube. According to another embodiment, the oxygenating unit 150 comprises a gas-mixture having a higher pressure generated by the Venturi effect. The oxygen in the bubbles is dissolved in the water. Preferably, the dissolved oxygen reaches a saturated concentration.

According to a more specific embodiment, the oxygenating unit 150 comprises a pressurized bubble tube, such as a Bubble Tubing™, which is a fine-bubble linear diffuser. Such an arrangement comprises a compressor which compresses the air or other oxygen-containing gas such that the fine bubbles are ejected from the fine-bubble linear diffuser with a high pressure. Examples of pressures to be produced for the air bubbles are between 0.34 bar and 0.68 bar. The compressor needs to produce a pressure that includes the air bubble pressure (exemplary range between 0.34 bar and 0.68 bar), plus the overhead that includes the pressure of the water column and the fluid resistance losses in the tube. The compressor thus needs to be set up at a given pressure that depends on the height of the water column. This can be adjusted either by measuring the pressure of pressurized air or by monitoring the flow of pressurized air which is in relation with the expected air bubble pressure. The compressor can thus be adjusted such that, depending on the measured air flow, it produces fine air bubbles of a pressure comprised between 0.34 bar and 0.68 bar at the bottom of the water column in the bioreactor.

Having pressurized air bubbles, especially within the exemplary range noted above, ensures proper dissolution of the oxygen in the water (considering the water is at an operational temperature).

Together, the oxygenating unit 150, the wall 130, the support members 180 and the perforated pipe 120 form a cartridge. According to an embodiment, the cartridge further comprises a pump for pumping the wastewater into the cartridge from the water input 110.

According to an embodiment, the oxygenating unit 150 is used with a gas compressor for compressing the oxygen-containing gas mixture before injecting it into the water, thereby advantageously generating a higher pressure. This higher pressure is advantageous for efficiently mixing the wastewater with oxygen-containing bubbles, thereby obtaining a more uniform and oxygen-rich water column in the passageway 140, which is preferable in an aerobic zone. This mixing of water is apparent from the vigorous surface bubbles shown in FIG. 5. Since bubbles are generated at the bottom 145 of the container, they are taken up due to their low density, a process which does not require energy. Going up from the bottom enables the oxygenation of the whole water column.

Because of the presence of nutrients and oxygen, the aerobic bacteria can grow on their substrate (i.e., on the surface of the wall 130) and reach a steady state of operation in which organic matter is degraded. Embodiments can use obligately aerobic bacteria, facultatively aerobic bacteria or a combination thereof. Therefore, the wall 130 has a double role: defining a passageway 140 through which the wastewater is forced to travel, and hosting aerobic bacteria that can live at the surface of the wall 130 using the organic waste in suspension in the wastewater and the oxygen dissolved in the wastewater by the oxygenating unit 150.

Some of the existing systems use a sophisticated membrane that is impermeable to water but permeable to oxygen, in which the oxygen is provided inside the membrane where the bacteria grow to form bacterial films. The embodiments described herein do not necessitate such an expensive and complex membrane, but rather a very simple and cheap wall having the characteristics presented above, which is more suitable for situations in which septic tanks or other types of primary water treatment are used (e.g., in suburban or rural areas, in remote or isolated places).

The length of the passageway 140 and the rate of oxygen injection are set to get the desired oxygen demand at the end of this process. However, as this is often not sufficient for complying with regulations, there are embodiments which further comprise an unventilated zone 160. After the water traveled through the whole passageway 140 starting from the perforated pipe 120, it reaches the passageway end 165 at a periphery of the inside of the container, as shown in FIG. 2. After reaching this point, there is no more oxygenating unit 150 at the bottom 145 of the container: this is an unventilated zone 160. Since this is a low-oxygen environment, bacterial life growing in this environment are mostly anaerobic bacteria. Also, there are no more bubbles and the water is therefore not mixed anymore, which is the usual situation in the unventilated zone 160.

According to an embodiment, this unventilated zone 160 is directed to the degradation of organic material usually not efficiently degraded by aerobic bacteria, thereby completing the wastewater treatment. According to an embodiment, the purpose of the unventilated zone 160 is to enable sedimentation of the matter that is still in the water, since the presence of bubbles in the aerobic zone prevents sedimentation.

At an upper portion of the unventilated zone 160 and at a given height in the container, there is provided a water output 190 formed of a pipe, a duct or another type of tubing for outputting the water outside of the bioreactor 10. There is usually provided an opening 175 for letting the water exit the unventilated zone 160 via the water output 190. According to an embodiment, the opening 175 comprises a plurality of apertures (as shown in FIG. 2).

According to an embodiment, at the opening 175 or at the water output 190, there is provided a sampling unit 170 for sampling the water and testing its compliance with regulatory requirements.

The water is then disposed of according to the regulations. Since the water is supposed to have been treated, it can be outputted to the environment, for example in a small field or watercourse.

Figure 8A:
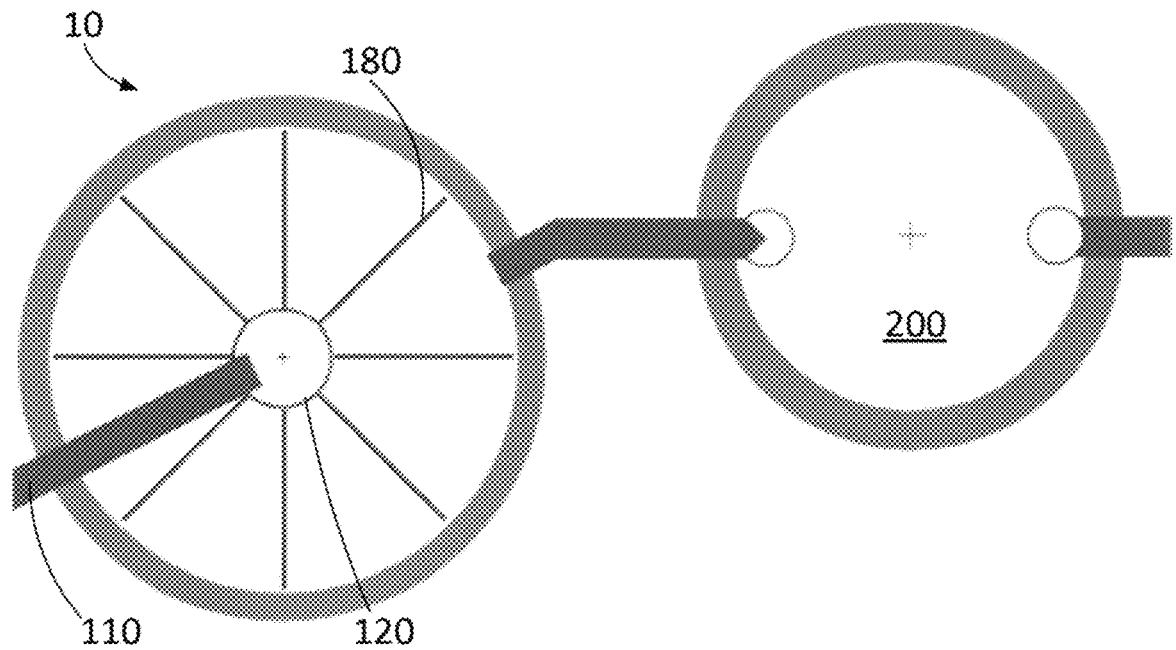
FIGS. 8A and 8B are respectively a top view and a side view of the bioreactor with a decanter, according to an embodiment.
Figure 8B:
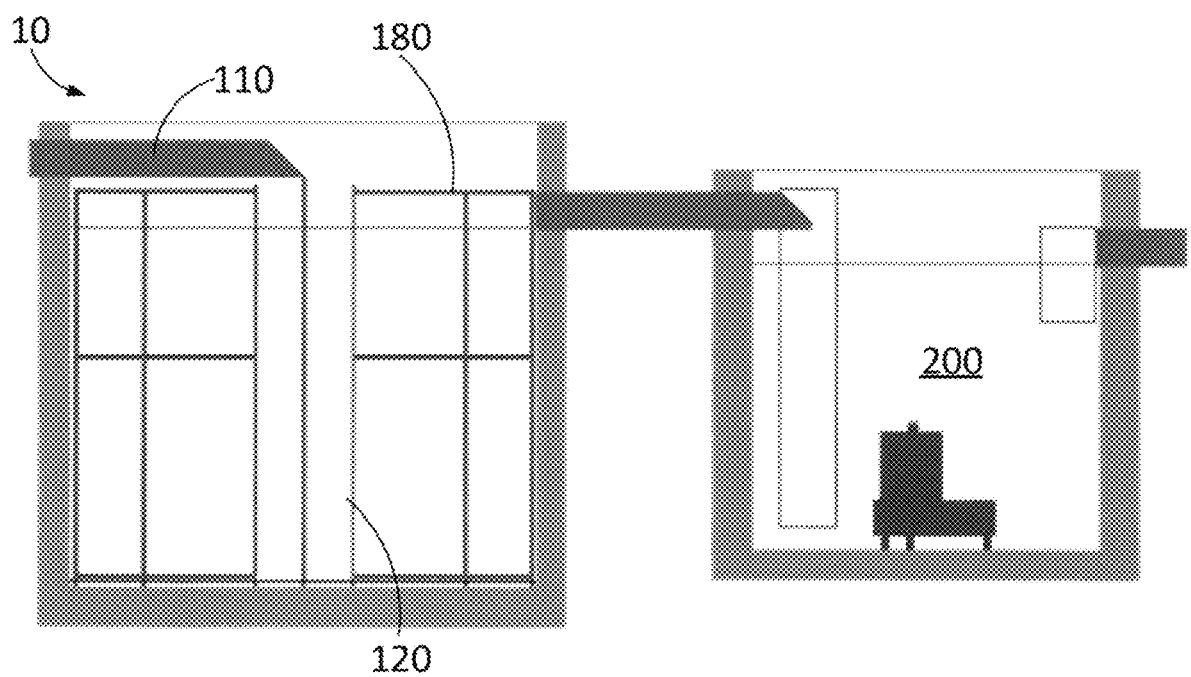

In another embodiment shown in FIGS. 8A-8B, there is shown a bioreactor 10 having no unventilated zone 160. The absence of the unventilated zone 160 can be achieved either by physically removing this zone from the bioreactor (by reducing the size of the body 100 or by enlarging the coverage of spirally-extending wall 130), or by aerating the zone which would still be present (probably in a smaller form factor), as for the passageway 140.

The water output 190 is rather fluidly connected to a decanter 200, shown in FIGS. 8A-8B. The decanter 200 is used for decanting and isolating residual matter. Removing the unventilated zone 160 makes the bioreactor simpler since it is only an aerobic treatment system that can be plugged to a septic tank (or another type of primary water treatment) and a decanter 200 for a well-defined processing line for wastewater treatment.

The decanter 200 is thus used for anaerobic treatment of the effluent from the bioreactor 10 which previously underwent aerobic treatment. A removal of the sludge accumulating in the decanter 200 should be performed periodically.

Figure 7:
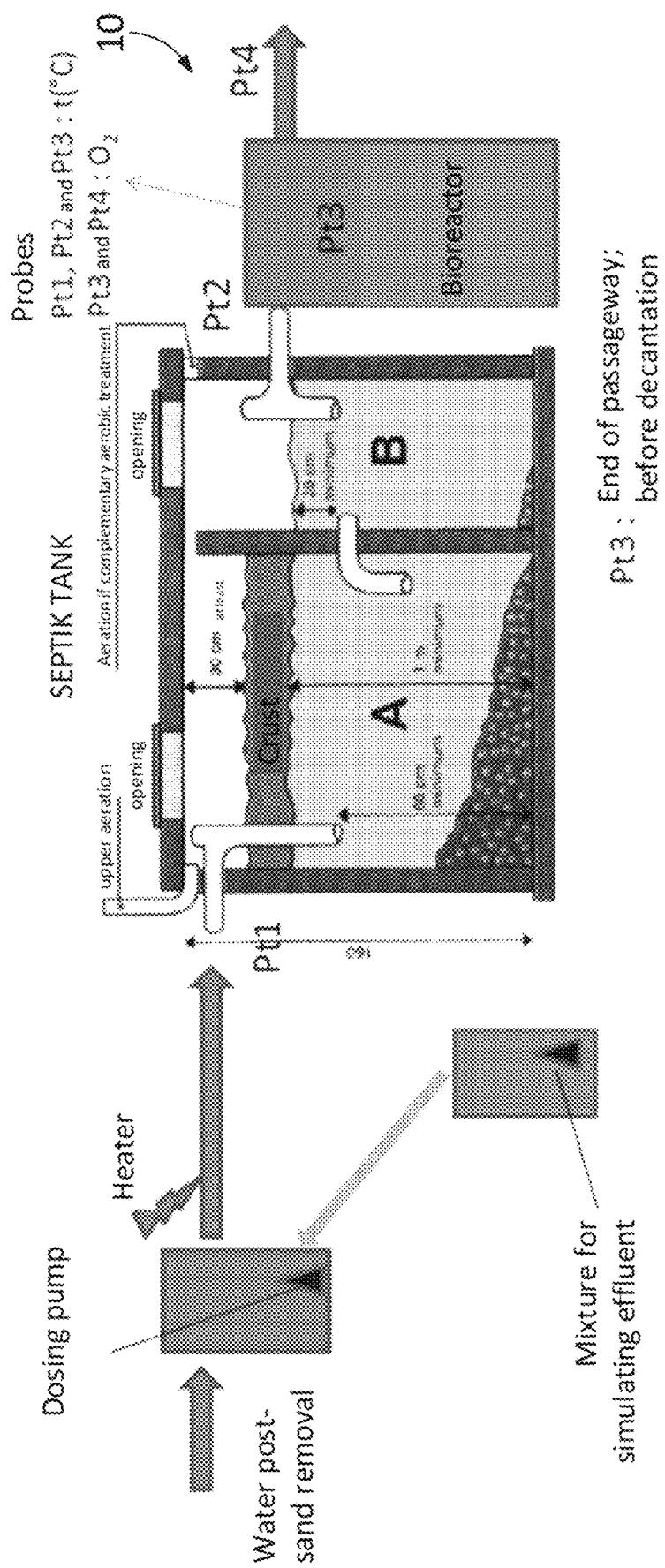
FIG. 7 is a diagram of a treatment system comprising the bioreactor and used to test the system, according to an embodiment.

According to an embodiment, the outputted water is then treated by a UV disinfection process using a UV lamp, downstream of the bioreactor (e.g., upstream, in or downstream of the decanter 200 as shown in FIG. 7). According to an embodiment, the water output 190 comprises a pump for efficiently pumping outputted water away, e.g., to a primary treatment site such as a lagoon.

EXAMPLE

A prototype of the bioreactor was tested in a laboratory setting, as shown in FIG. 7, for measuring the performance of the bioreactor in terms of treatment of wastewater for various pollutants.

Performance parameters that were measured are: CBOD5 (5-day carbonaceous biological oxygen demand) and TSS (total suspended solids) according to a given standard (for instance, in this case, the Canadian standard class B-III of CAN/BNQ 3680-600/2009, where 15 mg/L for both parameters are targeted) and class D-I (50 000 CFU/100 mL) for the removal of fecal coliforms. In addition, nitrogen and phosphorus were evaluated to determine the behavior of the technology regarding these parameters.

The experiment was performed on the complete processing line, comprises a prototype of the bioreactor 10 coupled with a septic tank of intermediate size in accordance with the test conditions.

In order to allow representativeness of a residential application, the water was supplemented at the inlet of the system with BOD5, nitrogen and phosphorus according to the average requirements of the Canadian standard CAN/BNQ 3680-600/2009 (methanol to >200 mgBOD5/L, urea to >50 mgN-NTK/L, sodium bicarbonate to >175 mgCaCO3/L and potassium phosphate to >9 mgP/L).

The temperature of the water entering the system was controlled by a cooling/heating element for simulating different times of year. Similarly, the air source for feeding the aeration system was placed if necessary in a cooling chamber to simulate the winter conditions.

A UV lamp was integrated at the output of the bioreactor to maximize the removal of fecal coliforms, generating a fifth measurement point (Pt5).

The first two months (period 1) served as the acclimatization or "ramp-up" period and the increase in load (b) of the process, all at a temperature of 15° C. Thereafter, period 2, lasting three months, was to study an operating mode with reduced load corresponding to a situation of three bedrooms (1.3 m$^3$/d) with variation of daily flow as well as a simulation of variation of the seasonal temperatures. Period 3, having a duration of three months, was used to study a maximum hydraulic load corresponding to five bedrooms (1.8 m$^3$/d).

To simulate variable feeding conditions, the system was fed differently for weekdays and weekends in accordance with the sequences defined in CAN/BNQ 3680-600/2009.

Monitoring of Treatment and Operational Behavior

At weekly intervals, composite samples were taken from the system (Pt1 and Pt4, shown in FIG. 7) as well as two critical points of the process (Pt2, Pt3 and Pt5). For Pt3, the sampling point was in the last aerated section of the geotextile, as shown in FIG. 7. In practice, Pt3 was located at the end of the passageway 140 in the following experimental setting, Results The system was monitored over a period of 245 days.

The sand-removed water was rather diluted, especially during the snowmelt period from March to April, explaining the lowest observed values (e.g., 120 mgBOD5/L, 31 mgTSS/L). To mitigate the variations, the chemical dosages were slightly increased to avoid perturbing the system and to allow the average target to be respected.

Removal of Organic Matter (BOD5)

FIGS. 9A-9B illustrate the evolution of the removal of the BOD5 (FIG. 9A: for the whole system, FIG. 9B: focus on the bioreactor). FIG. 9B shows the bioreactor input loads in kilograms per day (kg/d) (Pt2, ref: right scale) with the Pt3 and Pt4 concentrations and the output targets.

In FIG. 9A, there are variations at the input of the system (range of variation of the order of 200 mgBOD5/L), to be associated with snowmelt. The mean input load to the system is 0.35 kgBOD5/d (235 mg/L at an average flow rate of 1.5 m$^3$/d).

The septic tank made it possible to attenuate variations within a range of about 100 mgBOD5/L. This led to an average load of 0.12 kg BOD5/d at the inlet of the bioreactor at a flow rate of 1.3 m$^3$/d and an average load of 0.20 kgBOD5/d at the inlet of the bioreactor at a flow rate of 1.8 m$^3$/d. A change in behavior was observed at Pt3 during the first two condition changes at 10° C. and 1.8 m$^3$/d, reaching values of 90 mgBOD5/L. This disequilibrium was quickly eliminated as soon as the following sample was taken. It seems that a ramp-up time of one to two weeks is necessary for the biomass attached to the geotextile to adapt to its new condition. A sudden stall of biomass during sudden changes in condition could also be involved.

At the output of the bioreactor (Pt4), concentrations remained below the 10 mgBOD/L target for the entire duration of the project, even during the last extreme condition (1.8 m$^3$/d and 10° C.). However, during the latter period, some fluctuations not previously observed suggest that a limit of the process was reached.

Removal of Total Suspended Solids (TSS)

Figure 10A:
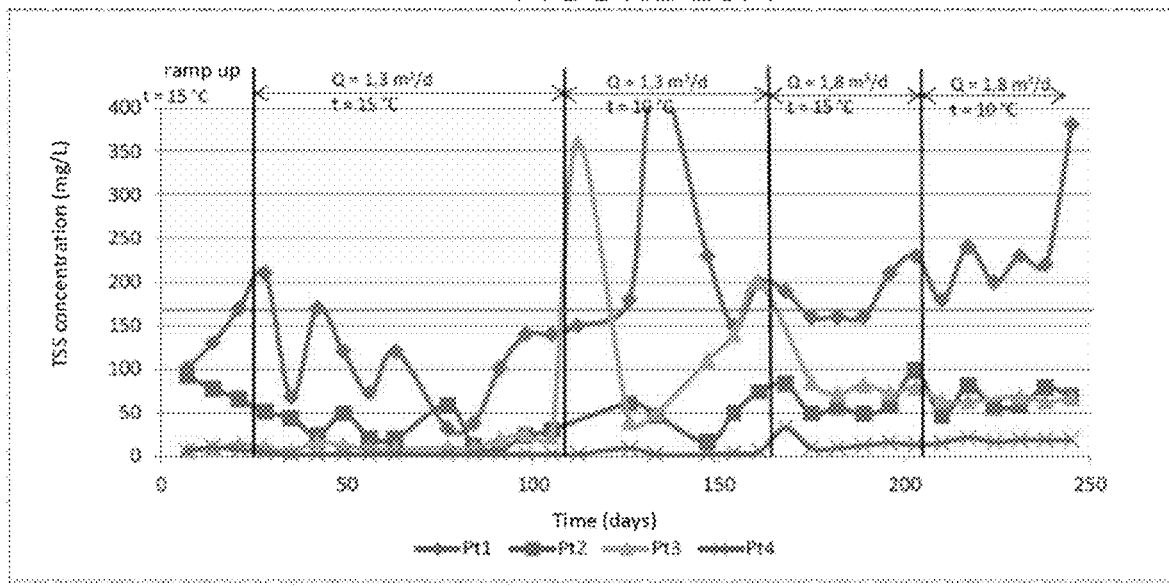
Figure 10B:
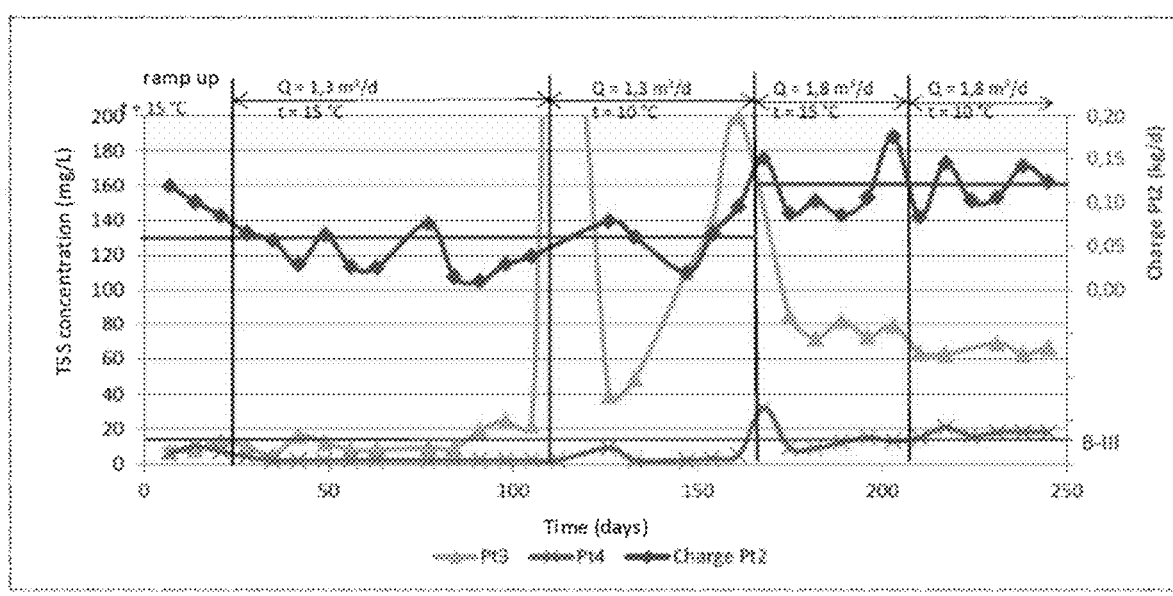

FIGS. 10A-10B illustrate the evolution of TSS removal (FIG. 10A: for the whole system, FIG. 10B: focus on the bioreactor). FIG. 10B shows the bioreactor injected loads, in kilograms per day (kg/d) (Pt2, ref: right scale), with Pt3 and Pt4 concentrations, and the output target FIG. 10A shows a variation profile similar to that encountered for the BOD5 at the input of the system (range of variation of the order of 200 mgTSS/L), in particular related to the period of snowmelt.

As illustrated in FIG. 10A, the septic tank has mitigated variations of TSS and acted on this pollutant to maintain continuously below 100 mgTSS/L at its output (Pt2). Referring to FIG. 10B, an average load of 0.06 kgTSS/d was encountered at the inlet of the bioreactor at a flow rate of 1.3 m$^3$/d and an average load of 0.12 kg TSS/da was encountered at the inlet of the bioreactor at a flow rate of 1.8 m$^3$/d.

A perturbation was observed at Pt3 essentially at the first change of condition at 10° C., reaching values above 200 mgTSS/L. This perturbation disappeared at the next sampling, but gradually returned thereafter for the entire period at 10° C. A sudden stall of biomass during sudden changes in temperature condition could be involved.

At the output of the bioreactor (Pt4), concentrations remained below 10 mgTSS/L throughout the operating period at 1.3 m$^3$/d even during the 10° C. condition. This behavior is indicative of a good capacity of the decantation zone to treat TSS from Pt3. However, when switching to 1.8 m$^3$/d, TSS approached the target of 15 mgTSS/L to reach 20 mgTSS/L in the last period at 10° C. The increase in viscosity of the water at cold temperature could explain the situation observed at 10° C. by affecting the rate of sedimentation of the particles; wastewater should therefore be kept warm enough.

It should be noted that no superior microorganisms (e.g., protozoa, rotifers and crustaceans) were observed at the end of Pt4 throughout the duration of the monitoring. The presence of these microorganisms at the outlet of the bioreactor could contribute to increasing the quantity of particles released. Despite of this, for future optimizations of the process, the presence of this type of microorganisms will have to be expected. Among other things, an optimization path would be to reduce the age of the sludge or biofilm in the bioreactor by more frequent maintenance of the bioreactor.

Reduction of Fecal Coliform

Figure 11:
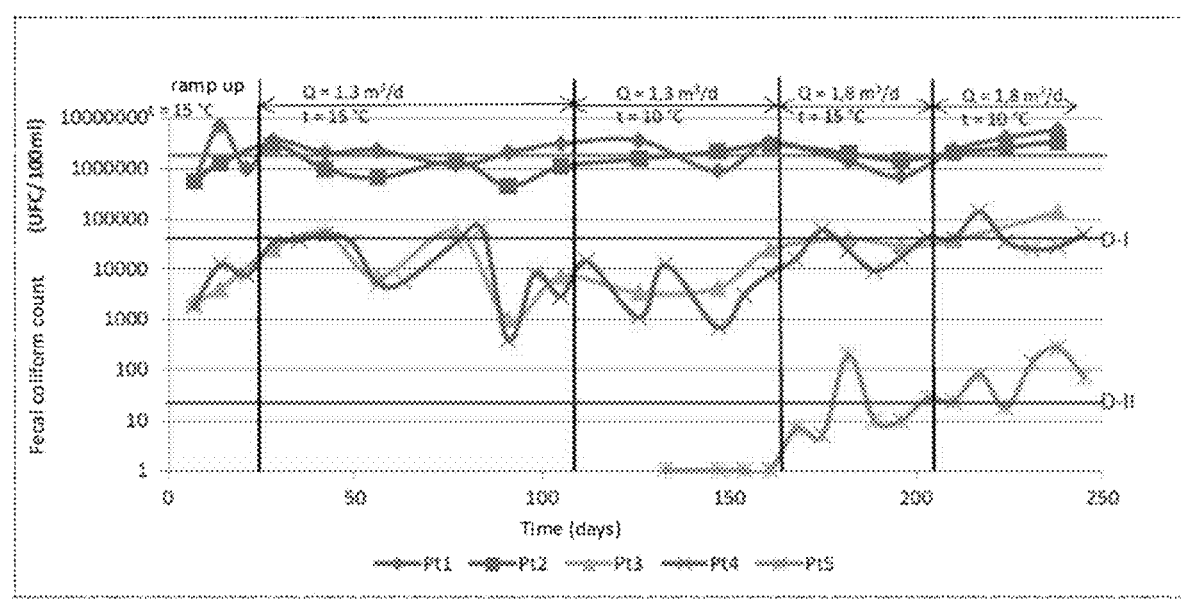

FIG. 11 illustrates the reduction of fecal coliform by the system. It shows the concentrations measured at the five measurement points and the target to be reached at exit.

As shown in FIG. 11, the septic tank does not significantly reduce fecal coliforms. The bioreactor accounted for a significant reduction of two logarithmic units to meet the goal of 50,000 CFU/100 ml (D-1) when operating at 1.3 m$^3$/d (geometric mean of 8000 CFU/100 mL). Since coliforms tend to adsorb on particles, some correlation can be established between the presence of coliforms and TSS levels, which may explain the behavior observed at 1.8 m$^3$/d. The integration of a UV lamp enabled the complete removal of fecal coliforms during operation at 1.3 m$^3$/d.

Removal/Processing of Nitrogen (TKN)

Figure 12A:
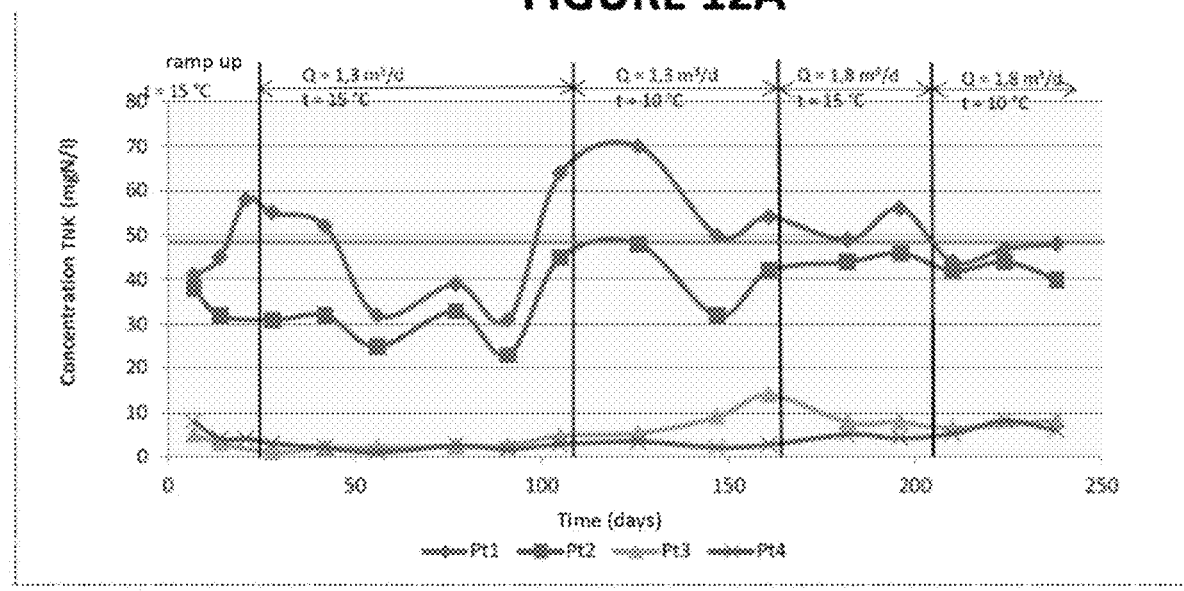
Figure 12B:
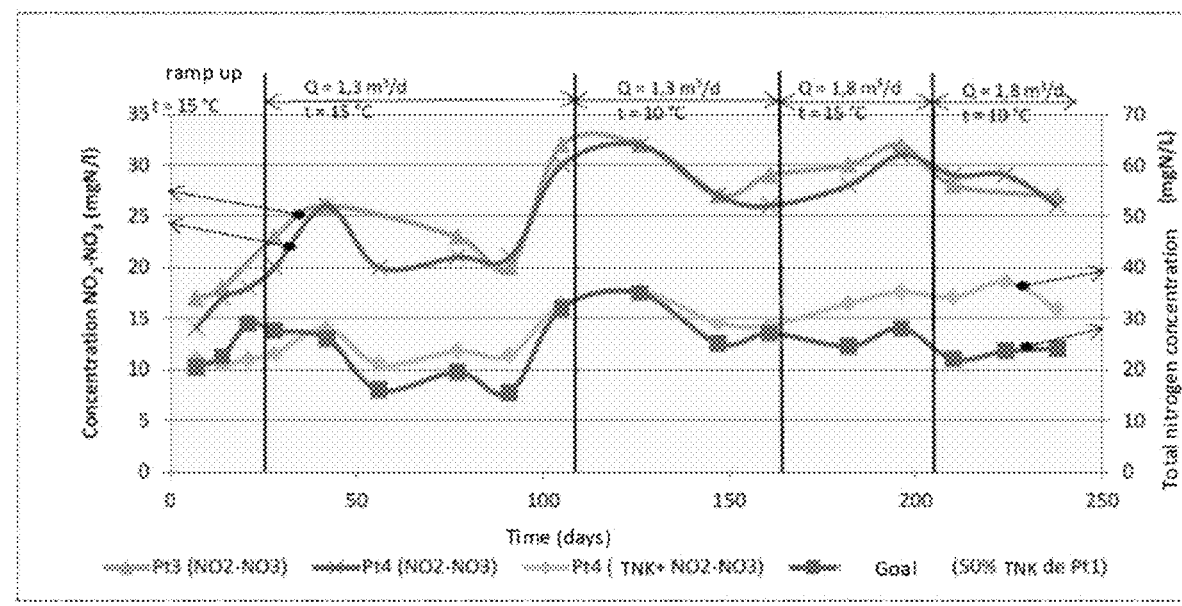

FIGS. 12A-12B illustrate the evolution of nitrogen removal/transformation (FIG. 12A: system as a whole for TKN; FIG. 12B: only for the bioreactor and specific for NO$_2$-NO$_3$ by-products). FIG. 12B shows (right scale) the concentrations of total nitrogen (TKN+NO2-NO3) at Pt4 and the target concentration at the output according to the target class (50% of the TKN of Pt1). In FIG. 12A, a variation profile similar to that encountered for the BOD5 at the entry of the system (range of variation of the order of 40 mgTKN/L) is observed, particularly during snowmelt. As illustrated in FIG. 12A, the septic tank removes some of the TKN in particulate form. Despite cooler conditions and higher flow rates, the bioreactor maintained good yields for the transformation of TKN with values continuously less than 10 mgN-TKN/L, as early as Pt3 (ref.: FIG. 12A). The slightly higher values of TKN at Pt3 on day 160 are related to the organic nitrogen of the suspended biomass. Referring to FIG. 12B, the mechanism of nitrogen conversion by nitrification was rapidly taking place in the bioreactor with values of 15 to 20 mgN-NO$_3$/L to Pt 3 as early as the ramp-up period. With higher inlet concentrations at 100 days, nitrification increased to 25-30 mgN-NO3/L at Pt3-Pt4 (overall average of 28 mgN-NO$_3$/L at Pt4). The bioreactor allows a good conversion of nitrogen to nitrates (NO$_3$).

Evolution of pH and Alkalinity

Figure 13:
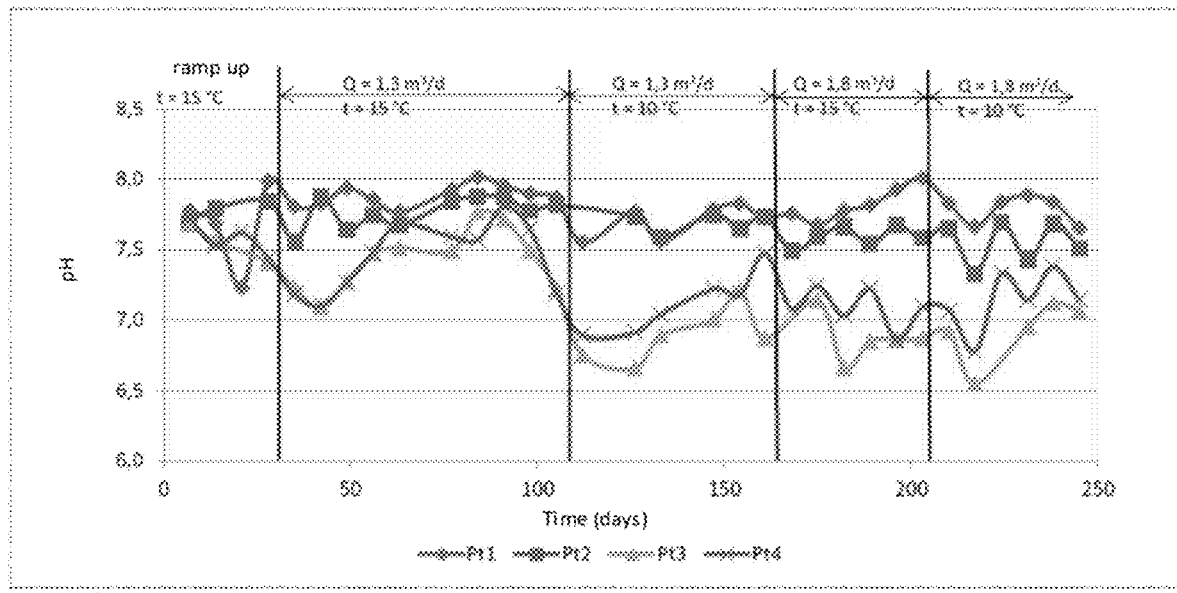
Figure 14:
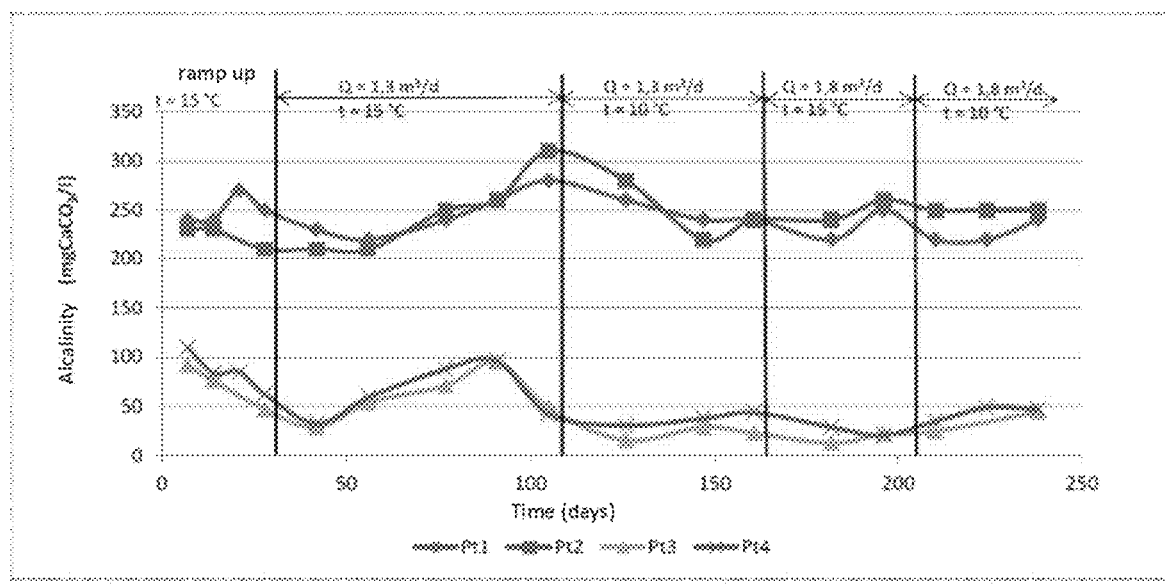

The evolution of pH and alkalinity is shown in FIGS. 13 and 14, respectively. With water pH between 7.5 and 8 at the input of the system (Pt1), the bioreactor reduced the pH by 0.5 to 1 unit at Pt3, in relation with the nitrogen transformation mechanisms. The main drop in pH was observed around the 100th day when nitrification intensified. The decantation zone then allows a slight increase in pH with values from 7 to 7.5 at Pt4.

The alkalinity of the input water was between 200 and 300 mgCaCO$_3$/L, i.e., making a buffer to limit the pH variations. These alkalinity concentrations were sufficient to control the pH decreases associated with nitrification.

Phosphorus Concentration

Figure 15:
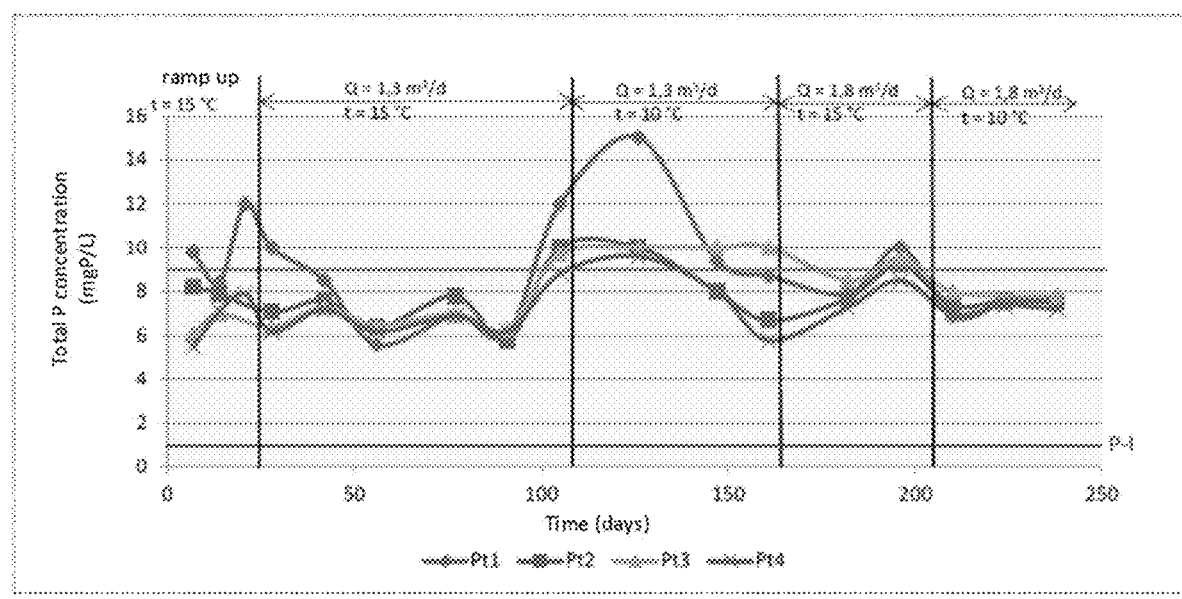

FIG. 15 shows the evolution of phosphorus concentrations in the system. It shows the concentrations measured at the four monitoring points and the discharge target. The system provided some removal of phosphorus, i.e., about 1 mg/L by the septic tank and 1 mg/L by the bioreactor. Thus, average Pt4 phosphorus concentration was 7.2 mgP/L. The septic tank attenuated the concentration peaks that occurred at Pt1 (e.g., at 125 days). In the bioreactor, phosphorus releases were observed at Pt3 associated with suspended biomass particles around the 125th day. However, these releases were mitigated by the decantation zone by reducing the phosphorus concentrations to a level slightly lower than at Pt2.

Temperature Monitoring

Figure 16:
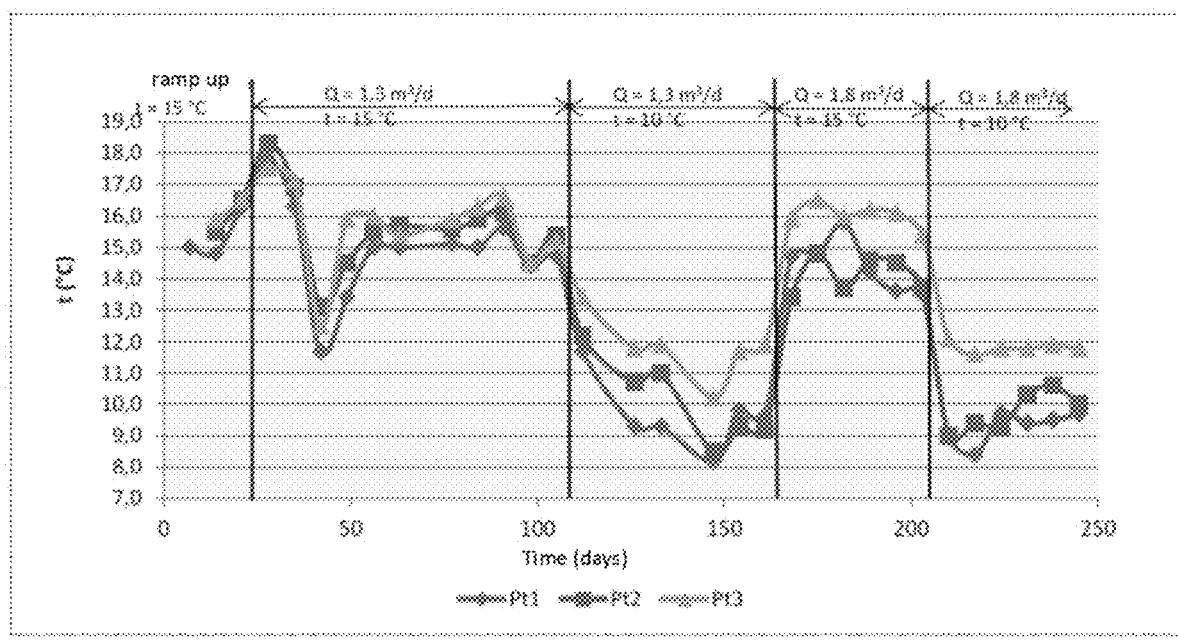

FIG. 16 shows the evolution of actual temperatures measured on a regular input/output basis of the septic tank (Pt1-Pt2) and in the bioreactor (Pt3).

Monitoring of Dissolved Oxygen in the Bioreactor

Figure 17:
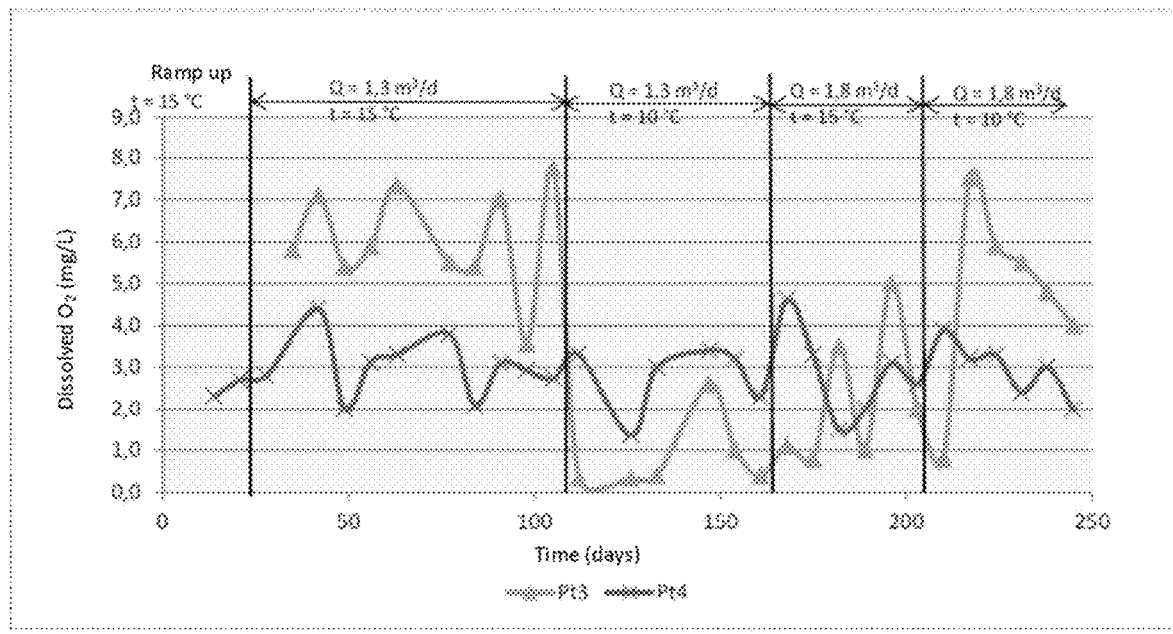

FIG. 17 shows the evolution of dissolved oxygen measured on a regular basis in the bioreactor (Pt3-Pt4). The majority of the data was measured at a specific time of day, just before the end of the morning feed cycle.

Dissolved oxygen varied considerably at Pt3 while it remained relatively stable at Pt4, advantageously, with values generally between 2 and 4 mg/L.

At Pt3, dissolved oxygen was above 5 mg/L for the first 100 days. However, upon passage to 10° C., a drop in dissolved oxygen was observed with values below 1 mg/L. This situation was restored during the transition to 1.8 m$^3$/d, with concentrations oscillating between 1 and 6 mg/L. It appears that the presence of suspended biomass, as encountered during the first cold period, greatly affects the oxygen consumption at the point of measurement.

Since dissolved oxygen remained generally above 2 mg/L at Pt4 during a feeding period, no air control was performed during the project and only one blower was used.

Figure 18:
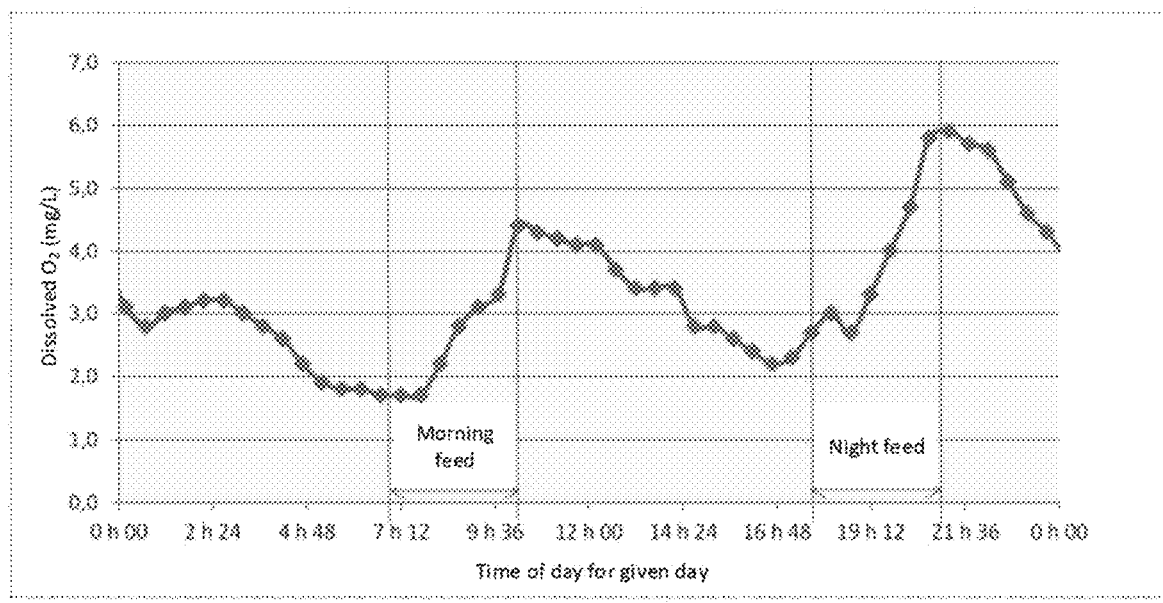

FIG. 18 shows a typical example of variation of dissolved oxygen at Pt4 monitored continuously on a given day. When the bioreactor is not supplied with wastewater, a drop in dissolved oxygen is observed at Pt4. When a feed cycle resumes, the dissolved oxygen increases again. This is contrary to what would be expected considering the waste entering the system during the feeding period. In fact, hydraulic circulation is necessary within the bioreactor so that the dissolved oxygen reaches Pt.4. When there is no hydraulic circulation, the oxygen remains in the central part of the bioreactor and the oxygen then present at its outlet (Pt4) is gradually consumed.

Monitoring the Flow of Air Injected into the Bioreactor

Figure 19:
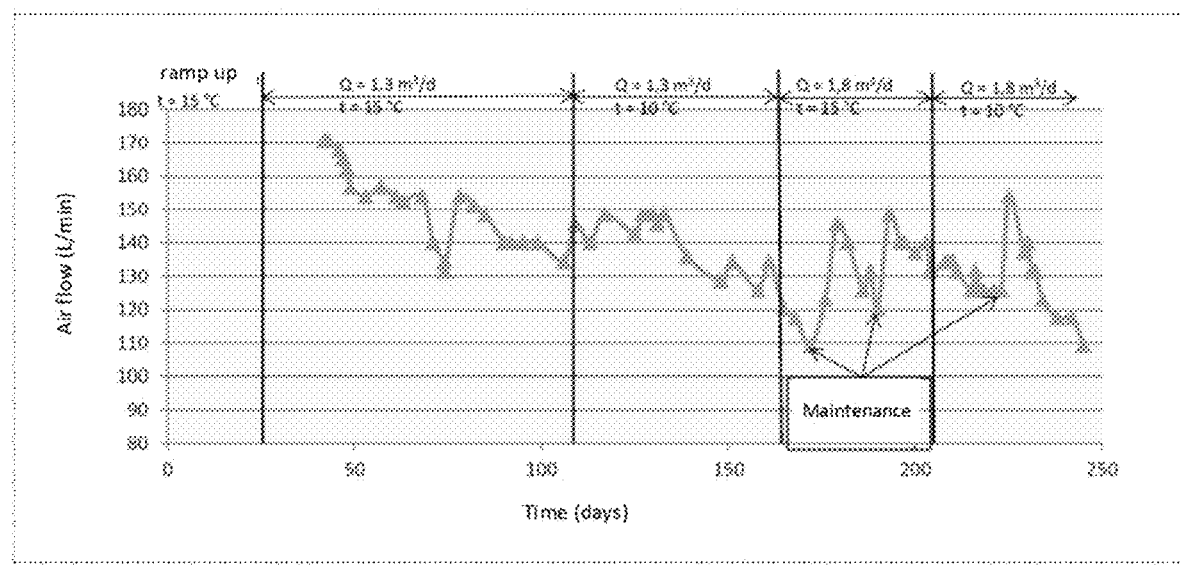

FIG. 19 shows the evolution of the air flow injected into the bioreactor. This flow was generated by a single blower throughout the project.

Overall, airflow decreased from 170 L/min to 150 L/min after 125 days and reached 110 L/min by the 175th day. This decrease would be related to the clogging of the apertures of the oxygenating unit 150 placed at the bottom of the bioreactor 10. As a preventive measure, a few maintenance interventions consisting of punctual injection of compressed air (3 times, from 5 to 10 seconds) made it possible to restore the air flow rate around 150 L/min and return to a level of 110 L/Min over a horizon of about 25 days. It should be noted that no malfunction has been observed with respect to the decreases in air flow. However, if the flow rate continues to fall, and in a maintenance-free operation, optimization measures should be considered, including possibly on the thrust capacity.

A sedimentation time of the order of 90 minutes (in static condition) should be considered to recover all the particles by decantation, either in the decanter 200 or in the unventilated zone 160, depending on the embodiment. The particles are very fine and therefore their sedimentation rate can easily be affected by the hydraulic flow as well as by the temperature of the liquid.

Monitoring of Geotextile Colonization

In order to better understand the evolution of bacterial colonization of the geotextile, weekly verifications of their colonization were performed. After three weeks, the geotextile was in a relatively stable state of colonization. Stabilization of the thickness of the biofilm at a given point would be associated with achieving a balance between growth and mortality of biomass.

All-In-One Treatment Apparatus

There is now described a treatment apparatus comprising the bioreactor described above, as shown in FIGS. 20-22.

Figure 20:
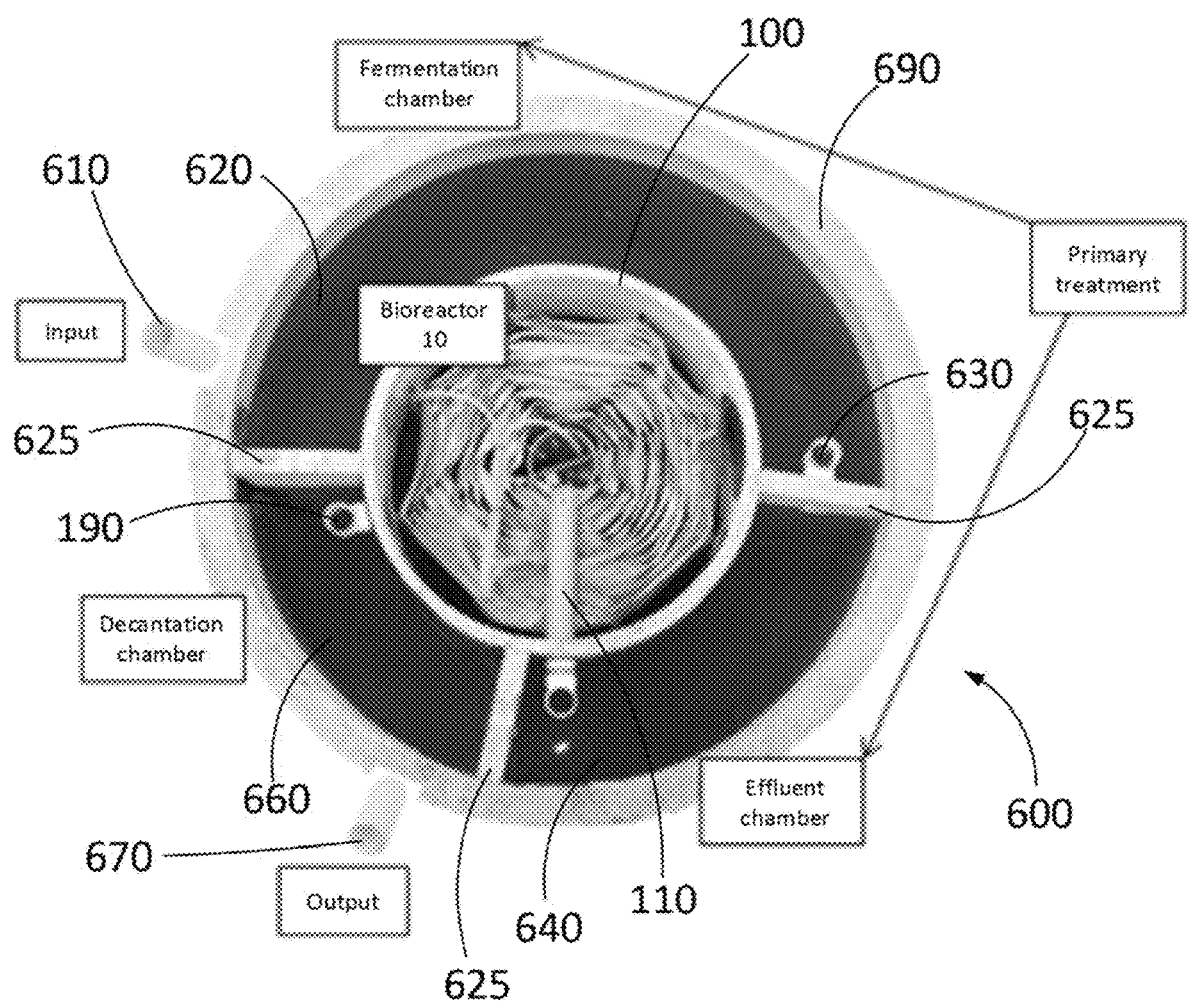
FIG. 20 is a top view of a treatment apparatus comprising the bioreactor, according to an embodiment.
Figure 22:
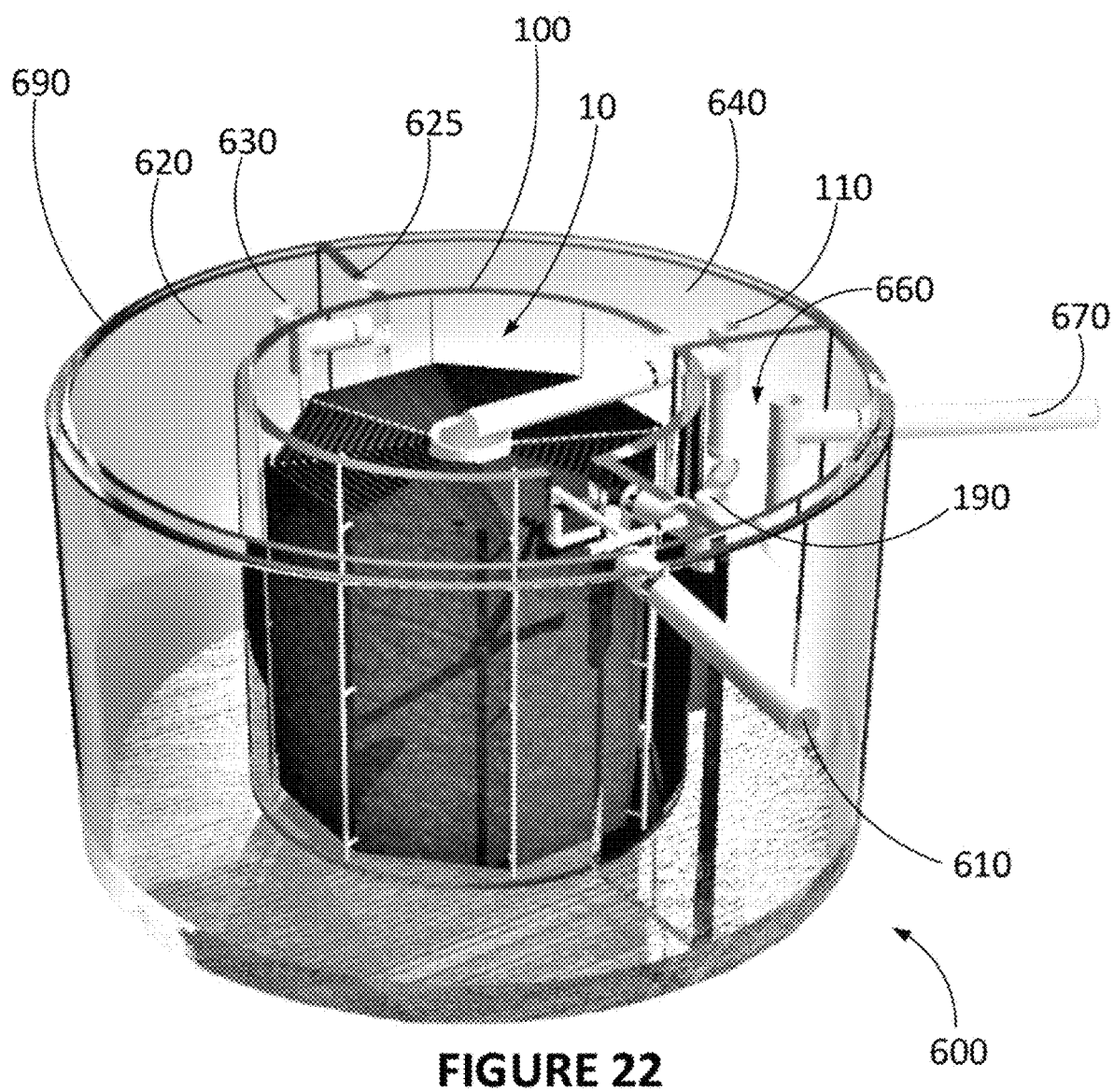
FIG. 22 is a perspective view of a treatment apparatus comprising the bioreactor and with transparent walls for greater visibility, according to an embodiment.

FIGS. 20 and 22 show that the treatment apparatus 600 is a self-contained unit where all components for treatment are enclosed. The treatment apparatus 600 comprises the bioreactor 10, which can be provided according to one of the embodiments as described above. However, the unventilated zone 160 may not be required, and the bioreactor 10 may be sized accordingly to fill mostly its own dedicated chamber.

According to an embodiment, the treatment apparatus 600 has a container in the shape of a cylinder. The bioreactor 10, also substantially cylindrical, is installed at the center thereof, and the other components are installed around the bioreactor 10 in the shape of portions of disc when viewed from the top, as shown in FIG. 20 or 21A.

The other components include: a fermentation chamber 620, an effluent chamber 640 and a decantation or sedimentation chamber 660. The fermentation chamber 620 is to perform fermentation, the effluent chamber 640 is to perform level regulation, and the decantation or sedimentation chamber 660 is to perform decantation or sedimentation. An apparatus wastewater input 610 receives the inputted wastewater flow into the treatment apparatus 600, more specifically in the fermentation chamber 620. Once the fermentation chamber 620 performs fermentation, water flows, via a fluid communication device 630 (i.e., a pipe that connects the chambers), into the effluent chamber 640. Together, the fermentation chamber 620 and the effluent chamber 640 perform the primary treatment. They feed the bioreactor 10 using its water input 110, as described above. The wastewater output 190 of the bioreactor 10 directs the wastewater flow from the bioreactor 10 to the decantation chamber 660 for a final treatment, after which the wastewater is finally outputted from the treatment apparatus 600 at the apparatus wastewater output 670.

While the bioreactor 10 is installed substantially at the center of the treatment apparatus 600, other components are installed thereraround. The three surrounding chambers (620, 640, 660) are contiguous and provided circularly around the bioreactor 10 having an enclosure 100 that is cylindrical; they are separated by three partition walls 625.

Figure 21A:
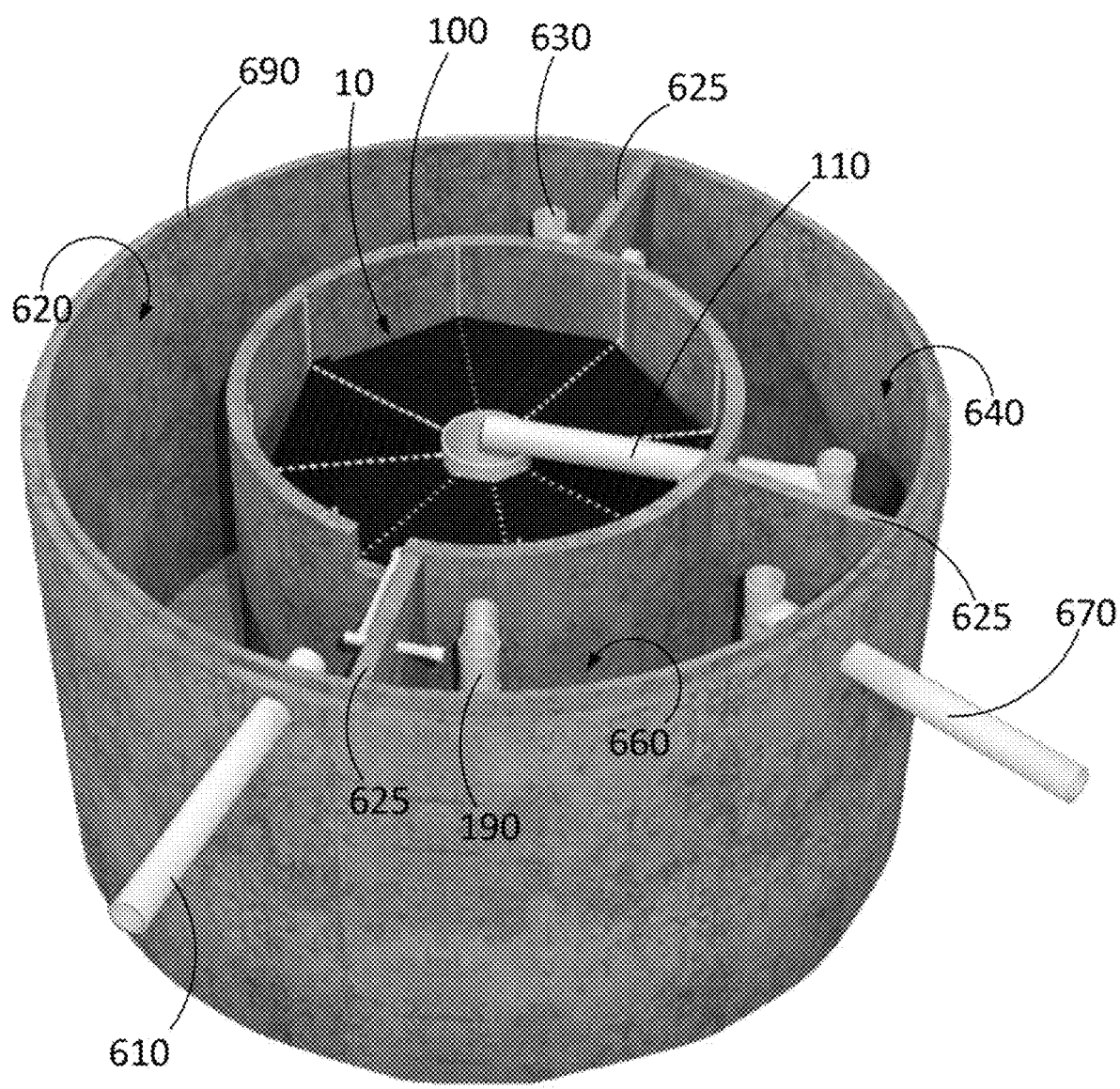
FIGS. 21A-21E are perspective views showing a treatment apparatus comprising the bioreactor but with different components removed for greater visibility, according to an embodiment.

FIG. 21A illustrates all chambers are arranged and communicate with each other. It can be seen that the bioreactor 10 has its own chamber, i.e., the body 100, which defines the inner portion of the other chambers. The apparatus enclosure 690, preferably a forming a cylinder, defines the outer walls of all other chambers, and partition walls 625 are provided in between to define the limit between each one of the chambers surrounding the bioreactor 10 and prevent wastewater flow except using the tubes that make each one of the chambers communicate with the other ones.

Figure 21B:
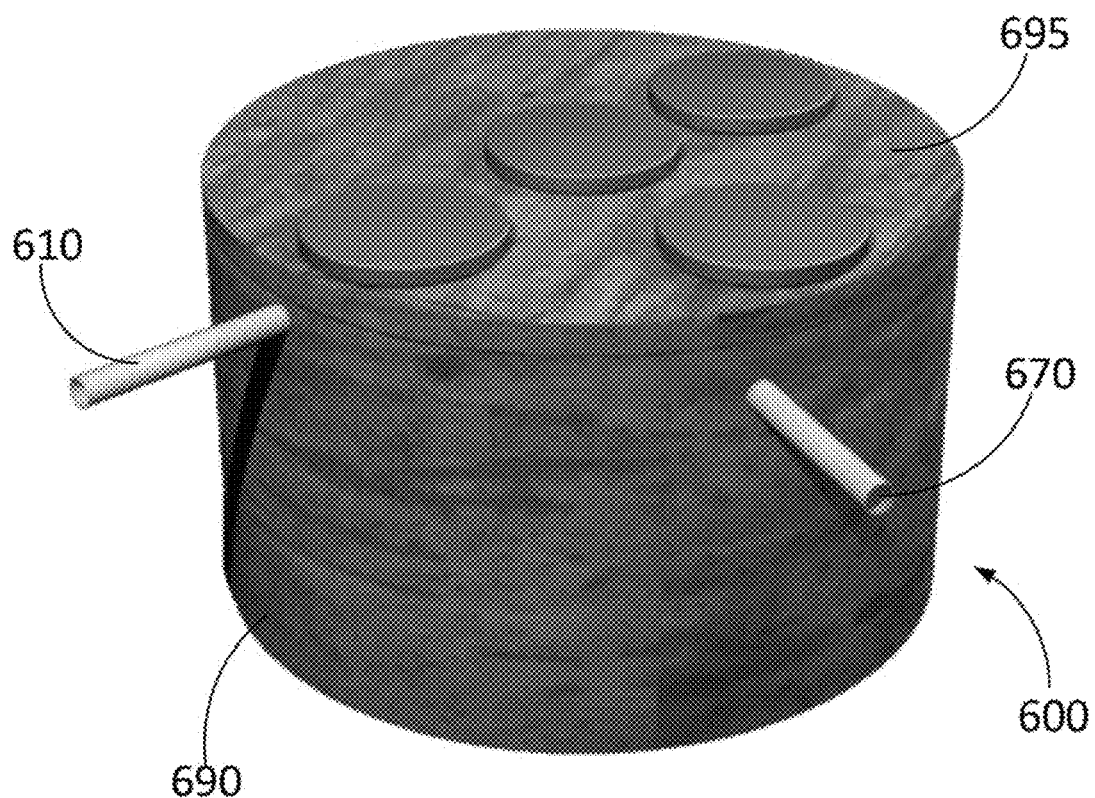
Figure 21C:
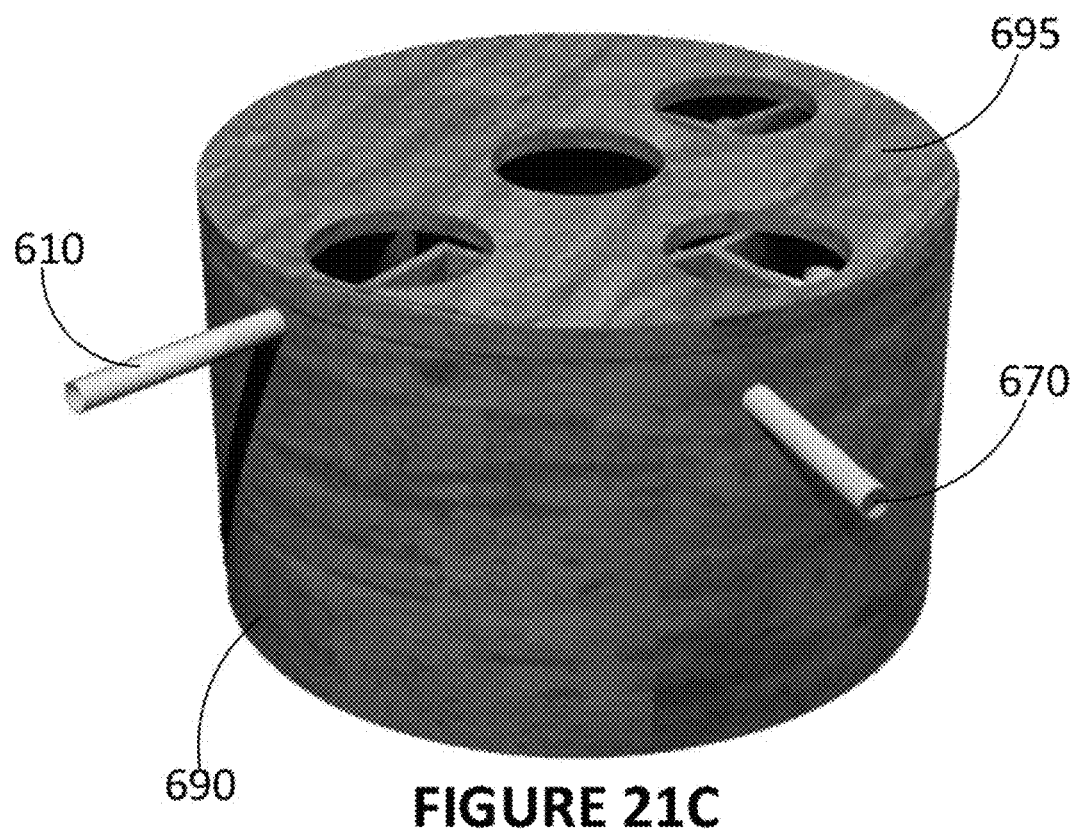
Figure 21D:
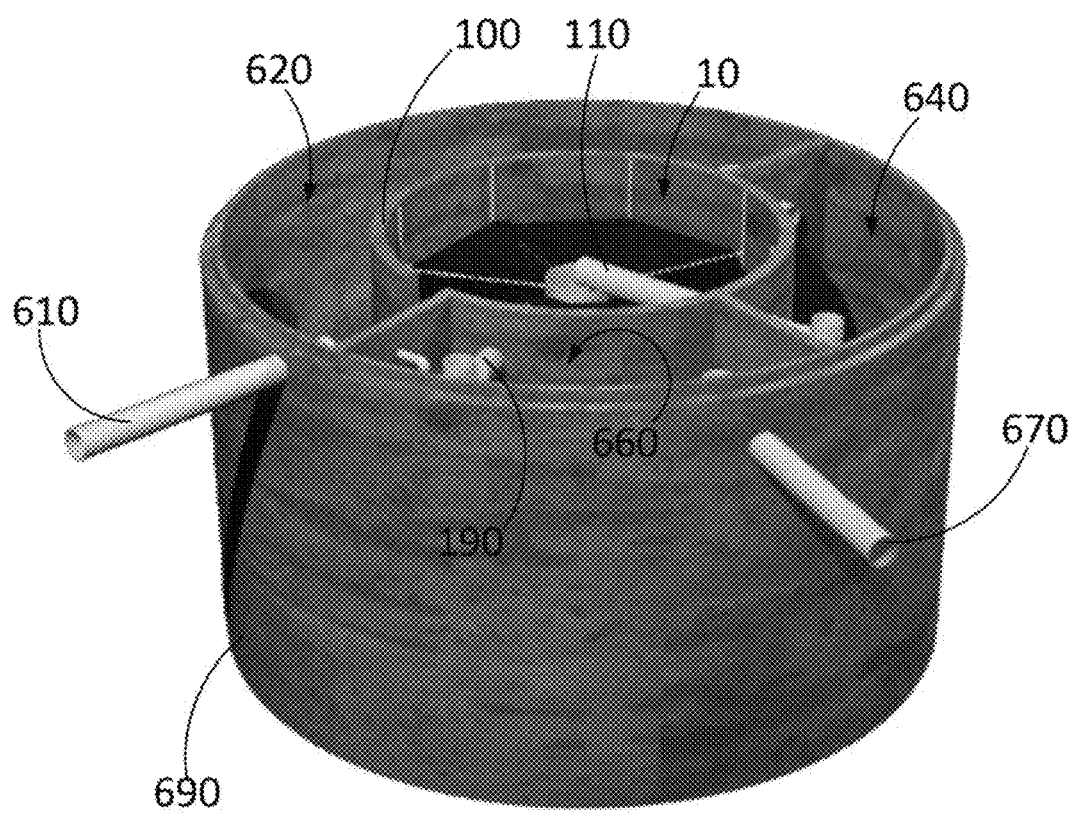
Figure 21E:
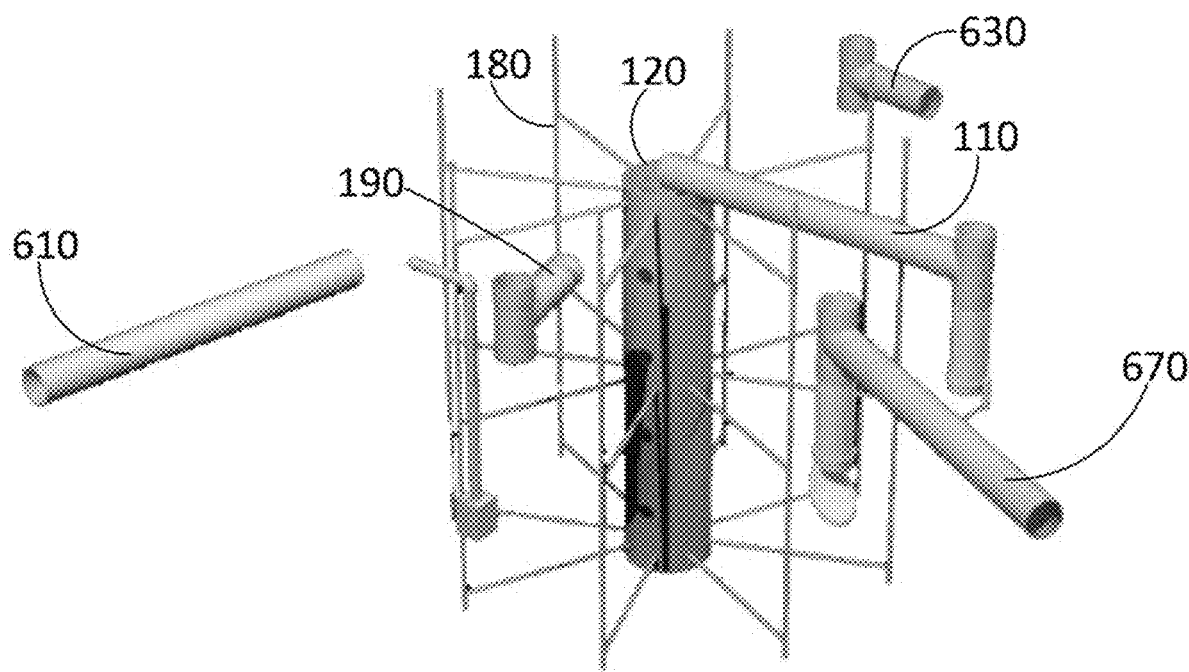

FIG. 21E shows that the treatment apparatus 600 can include the support members 180 that hold in place the walls 300 of the bioreactor 10 (which are flexible as they are preferably made of a geotextile membrane) with respect to the whole treatment apparatus 600.

FIGS. 21B-21D show that the components, once assembled, can be packaged as a single standalone unit that can be taken and placed somewhere, usually underground or partly underground. The apparatus cover 695 is shown and can have apertures thereon for inspecting the inside. When installed in the ground, the apparatus cover 690 should still be on the ground surface or above such that the unit can be looked into for inspection and accessed for maintenance. The compressor, mentioned above in relation with the oxygenating unit, should however be provided on the surface, preferably outside the self-contained unit.

This configuration ensures ease of installation and maintenance and makes the whole treatment apparatus 600 particularly compact, especially in the cylinder configuration shown in FIGS. 20-22.

While preferred embodiments have been described above and illustrated in the accompanying drawings, it will be evident to those skilled in the art that modifications may be made to provide possible variants.

The invention claimed is:

1. A bioreactor comprising:
a perforated tube for inputting wastewater therein;
a wall spirally installed around the perforated tube, such that portions of the wall become opposite to other portions, thereby defining a passageway receiving a volume of the wastewater between opposite portions of the wall and which, accordingly, follows a spiral shape, the passageway fluidly connected to the perforated tube and along which an entirety of the wastewater inputted in the perforated tube is forced to travel, the wall comprising a geotextile, in contact with the wastewater, adapted for hosting aerobic bacteria at a surface thereof; and
an oxygenating unit provided at a bottom of the passageway for dissolving oxygen in the entirety of the volume of the wastewater in the passageway such that the passageway defines an aerobic zone therewithin and the entirety of the volume of the wastewater in the passageway undergoes an aerobic treatment.

2. The bioreactor of claim 1, wherein the perforated tube extends vertically and comprises at least one of:
perforations; and
a vertically-extending opening;
allowing the wastewater inputted into the perforated tube to exit the perforated tube at a plurality of heights along the perforated tube.

3. The bioreactor of claim 2, further comprising support members secured, for support, to the perforated tube and holding the wall into a spiral shape.

4. The bioreactor of claim 3, wherein the wall is held stretched by the support members to undergo a non-zero tension to avoid a deformation of the wall, when wastewater is being forced to travel in the passageway, that could cause a portion of the wall to touch another facing portion of the wall.

5. The bioreactor of claim 4, wherein the geotextile is substantially made of polypropylene.

6. The bioreactor of claim 5, wherein the geotextile comprises a non-woven membrane.

7. The bioreactor of claim 6, wherein the geotextile has a thickness between 1 and 2 mm.

8. The bioreactor of claim 4, wherein the oxygenating unit comprises an oxygenating perforated tube having perforations for outputting gas bubbles, the gas bubbles having a substantial oxygen content, wherein the perforations are located to allow the bubbles to travel from substantially the bottom of the passageway upwardly to aerate the wastewater substantially along its whole height.

9. The bioreactor of claim 8, wherein the oxygenating perforated tube is pressurized to provide pressurized gas bubbles with a pressure allowing oxygen to substantially dissolve in the wastewater when the wastewater is at an operational temperature.

10. The bioreactor of claim 4, wherein the perforated tube for inputting wastewater is fluidly connected to an output of a primary treatment system.

11. The bioreactor of claim 10, wherein the passageway comprises an end at which wastewater is outputted, the end of the passageway being fluidly connected to a decanter which is distinct from the bioreactor.

12. The bioreactor of claim 10, wherein the passageway comprises an end at which wastewater is outputted, the end of the passageway being fluidly connected to a decanter which is an unventilated zone within the bioreactor.

13. A treatment apparatus having a substantially cylindrical enclosure with an apparatus wastewater input and an apparatus wastewater output, and comprising:
a bioreactor, at a center of the substantially cylindrical enclosure, comprising:
a pipe acting as a collector for inputting wastewater therein;
a wall spirally installed around the perforated tube, such that portions of the wall become opposite to other portions, thereby defining a passageway following a spiral, the passageway fluidly connected to the pipe acting as the collector and along which an entirety of the wastewater inputted in the pipe is forced to travel, the wall comprising a geotextile, in contact with the wastewater, adapted for hosting aerobic bacteria at a surface thereof; and
an oxygenating unit provided at a bottom of the passageway for oxygenating the passageway;
a fermentation chamber, in communication with the apparatus wastewater input, for receiving the wastewater in the treatment apparatus;
an effluent chamber, in communication with the fermentation chamber for receiving the wastewater therefrom, and with the pipe acting as the collector for inputting wastewater into the bioreactor; and
a decantation chamber, in communication with an output of the bioreactor, for receiving the wastewater therefrom, and with the apparatus wastewater output for outputting wastewater from the treatment apparatus;

wherein the fermentation chamber, the effluent chamber and the decantation chamber are provided around the bioreactor, thus forming a self-contained unit inside the cylindrical enclosure.

14. The treatment apparatus of claim 13, further comprising support members secured, for support, to the perforated tube of the bioreactor and to the cylindrical enclosure of the treatment apparatus and holding the wall of the bioreactor into a spiral shape.

15. The treatment apparatus of claim 14, wherein the geotextile is substantially made of polypropylene.

16. The treatment apparatus of claim 15, wherein the geotextile comprises a non-woven needle-punched membrane.

17. The treatment apparatus of claim 16, wherein the geotextile has a hydraulic permeability between 0.15 cm/s and 0.25 cm/s, and a filtration opening size between about 49 µm and about 91 µm.

18. The treatment apparatus of claim 17, wherein the geotextile has a thickness between 1 and 2 mm.

19. The treatment apparatus of claim 18, wherein the oxygenating unit comprises a pressurized air bubble diffuser, further comprising a compressor for providing pressure to the oxygenating unit.

* * * * *